(12) United States Patent
Yoshida

(10) Patent No.: US 8,772,960 B2
(45) Date of Patent: Jul. 8, 2014

(54) POWER TRANSMITTING AND RECEIVING SYSTEM FOR VEHICLE

(75) Inventor: Ichiro Yoshida, Takahama (JP)

(73) Assignee: Denso Corporation, Kariya (JP)

( * ) Notice: Subject to any disclaimer, the term of this patent is extended or adjusted under 35 U.S.C. 154(b) by 275 days.

(21) Appl. No.: 13/470,778

(22) Filed: May 14, 2012

(65) Prior Publication Data

US 2012/0299373 A1  Nov. 29, 2012

(30) Foreign Application Priority Data

May 23, 2011   (JP) ................................. 2011-114686

(51) Int. Cl.
 *B60L 1/00* (2006.01)
 *B60L 3/00* (2006.01)
 *H02G 3/00* (2006.01)

(52) U.S. Cl.
 USPC .......................................... 307/9.1; 307/104

(58) Field of Classification Search
 CPC ....... Y02T 10/90; Y02T 90/12; Y02T 90/124; Y02T 10/7005; B60R 16/03; B60R 16/033
 USPC .................................... 307/9.1, 104
 See application file for complete search history.

(56) References Cited

U.S. PATENT DOCUMENTS

| 2011/0114401 A1* | 5/2011 | Kanno ........................ 180/65.21 |
| 2011/0187321 A1 | 8/2011 | Hirayama | |

FOREIGN PATENT DOCUMENTS

| JP | A-1-298901 | 12/1989 |
| JP | A-7-236204 | 9/1995 |
| JP | A-8-103039 | 4/1996 |
| JP | A-2002-74577 | 3/2002 |
| JP | A-2010-68632 | 3/2002 |
| JP | A-2005-168085 | 6/2005 |
| JP | A-2005-210843 | 8/2005 |
| JP | A-2010-35333 | 2/2010 |
| JP | A-2010-68657 | 3/2010 |
| JP | A-2010-132088 | 6/2010 |

OTHER PUBLICATIONS

Japanese Office Action issued in Japanese Patent Application No. 2011-114686 dated Apr. 23, 2013 (w/translation).

\* cited by examiner

*Primary Examiner* — Carlos Amaya
(74) *Attorney, Agent, or Firm* — Oliff PLC

(57) ABSTRACT

A power transmitting and receiving system for a vehicle includes: an information communication device for transmitting/receiving vehicle positional relation specifying information; a power transmitting/receiving antenna for wirelessly transmitting/receiving an electric power between vehicles; a directionality specifying information transmitting/receiving device for transmitting/receiving directionality specifying information of the power transmitting/receiving antenna between vehicles; and an antenna directionality controller for controlling the directionality of the power transmitting/receiving antenna of the vehicles based on the vehicle positional relation specifying information and the directionality specifying information of the vehicles, so that the power transmitting/receiving antenna of the vehicle faces the power transmitting/receiving antenna of another vehicle.

5 Claims, 21 Drawing Sheets

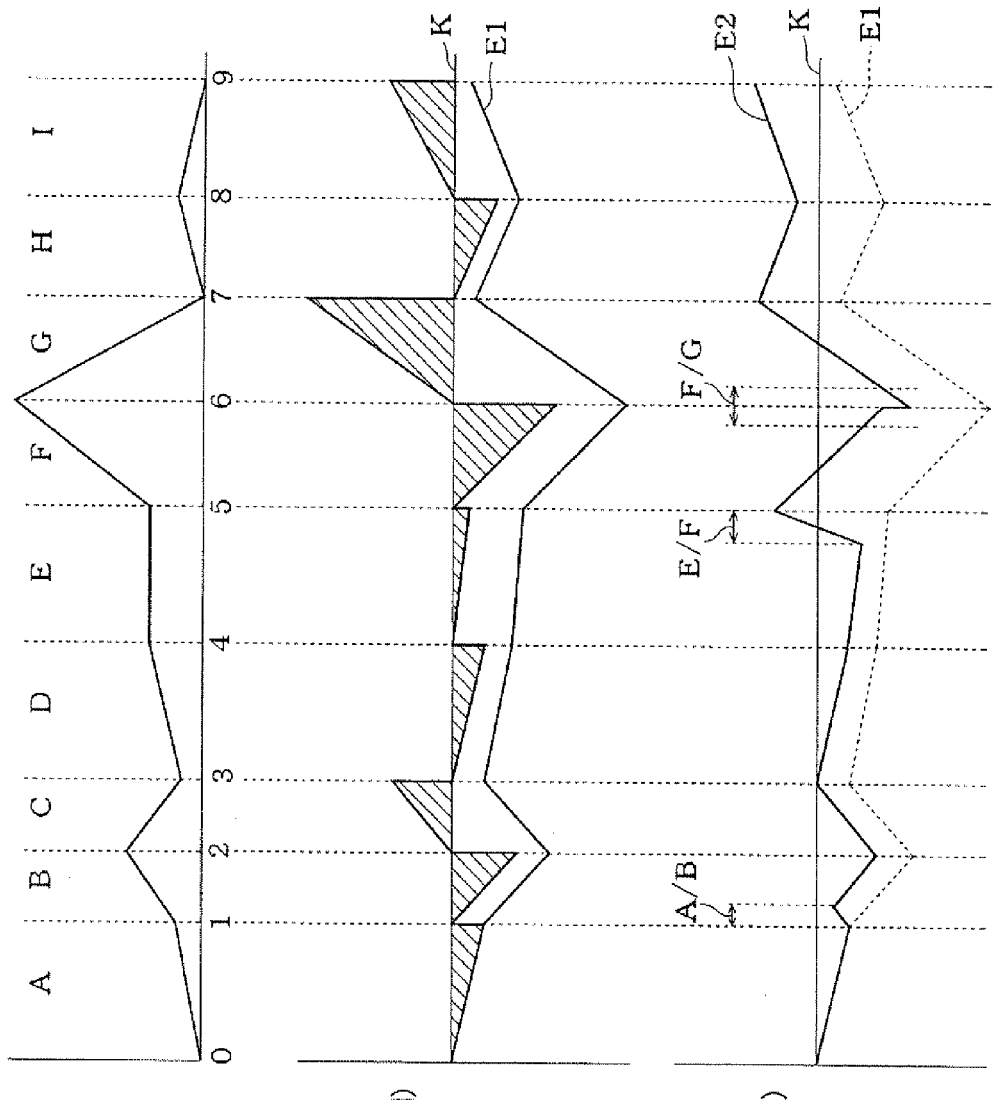

FIG. 24A  FIG. 24B  FIG. 24C
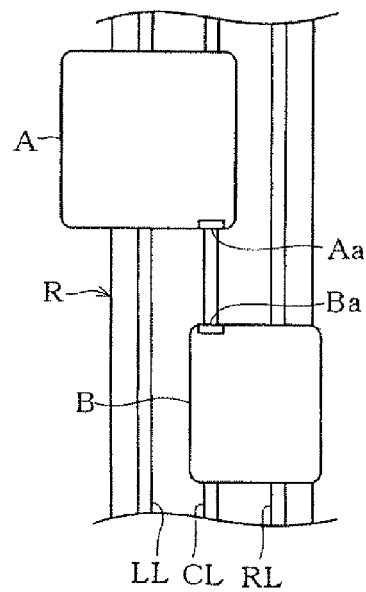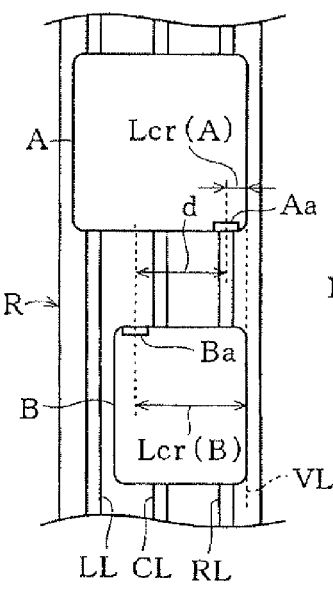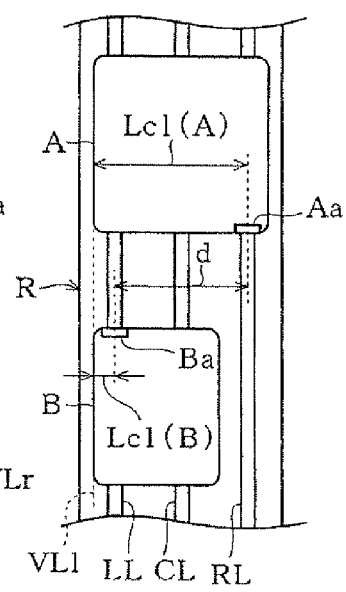
FIG. 25
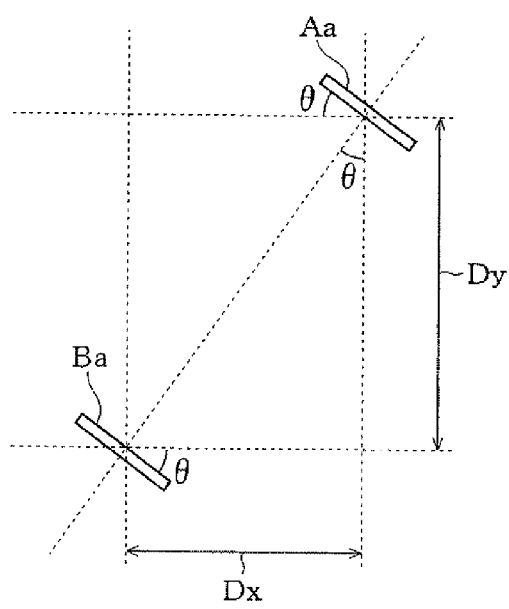

POWER TRANSMITTING AND RECEIVING SYSTEM FOR VEHICLE

CROSS REFERENCE TO RELATED APPLICATION

This application is based on Japanese Patent Application No 2011-114686 filed on May 23, 2011, the disclosure of which is incorporated herein by reference.

TECHNICAL FIELD

The present disclosure relates to a power transmitting and receiving system for vehicles. The system enables a vehicle to wirelessly transmit power of the vehicle to another vehicle and enables a vehicle to wirelessly receive power from another vehicle.

BACKGROUND

So-called electric vehicles that run on power charged to an in-vehicle battery are becoming popular in recent years. However, such electric vehicles have a difficulty that power becomes insufficient while the vehicle is running or the in-vehicle battery is damaged due to over-charging.

In order to solve this difficulty, as is disclosed, for example, in Patent Document 1, there is a technique of enabling a vehicle to wirelessly receive a supply of power from an outside source when power becomes insufficient and conversely enabling a vehicle to wirelessly supply power to an outside source when there is power to spare.

Also, for a system of this type, as is disclosed, for example, in Patent Document 2, there is a technique of making wireless power transmission and reception between vehicles feasible. Incidentally, in a case where wireless power transmission and reception is performed between vehicles, in particular, power cannot be transmitted and received efficiently unless running of each vehicle is controlled at a high degree of accuracy.

Patent Document 1: JP-A-2005-210843
Patent Document 2: JP-A-2005-168085

SUMMARY

It is an object of the present disclosure to provide a power transmitting and receiving system for vehicle enabling vehicles to wirelessly transmit and receive power efficiently in a case where wireless vehicle-vehicle power transmission and reception is performed.

According to an aspect of the present disclosure, a power transmitting and receiving system for a vehicle includes: an information communication device for communicating with another vehicle by transmitting and receiving vehicle positional relation specifying information, which includes: longitudinal inter-vehicle distance specifying information for specifying a distance between the vehicle and the another vehicle in front of or behind the vehicle; and lateral displacement amount specifying information for specifying an amount of lateral displacement between the vehicle and the another vehicle; a power transmitting and receiving antenna, which has a controllable directionality, transmits wirelessly an electric power of the vehicle to the another vehicle, and receives wirelessly an electric power of the another vehicle; a directionality specifying information transmitting and receiving device for transmitting directionality specifying information of the power transmitting and receiving antenna of the vehicle to the another vehicle and for receiving directionality specifying information of a power transmitting and receiving antenna of the another vehicle; and an antenna directionality controller for controlling the directionality of the power transmitting and receiving antenna of the vehicle and a directionality of the power transmitting and receiving antenna of the another vehicle based on the vehicle positional relation specifying information, the directionality specifying information of the vehicle, and the directionality specifying information of the another vehicle so that the power transmitting and receiving antenna of the vehicle faces the power transmitting and receiving antenna of the another vehicle.

In the above system, it becomes possible to efficiently transmit and receive power wirelessly between vehicles.

BRIEF DESCRIPTION OF THE DRAWINGS

The above and other objects, features and advantages of the present disclosure will become more apparent from the following detailed description made with reference to the accompanying drawings. In the drawings:

FIGS. 16A through 16C are diagrams used to describe a manner in which an energy balance changes with running of a vehicle;

FIGS. 24A through 24C are diagrams describing different running patterns (Part 3); and FIG. 25 is a diagram describing a computation method of a horizontal adjustment angle of antennas.

DETAILED DESCRIPTION

First Embodiment

Figure 1:
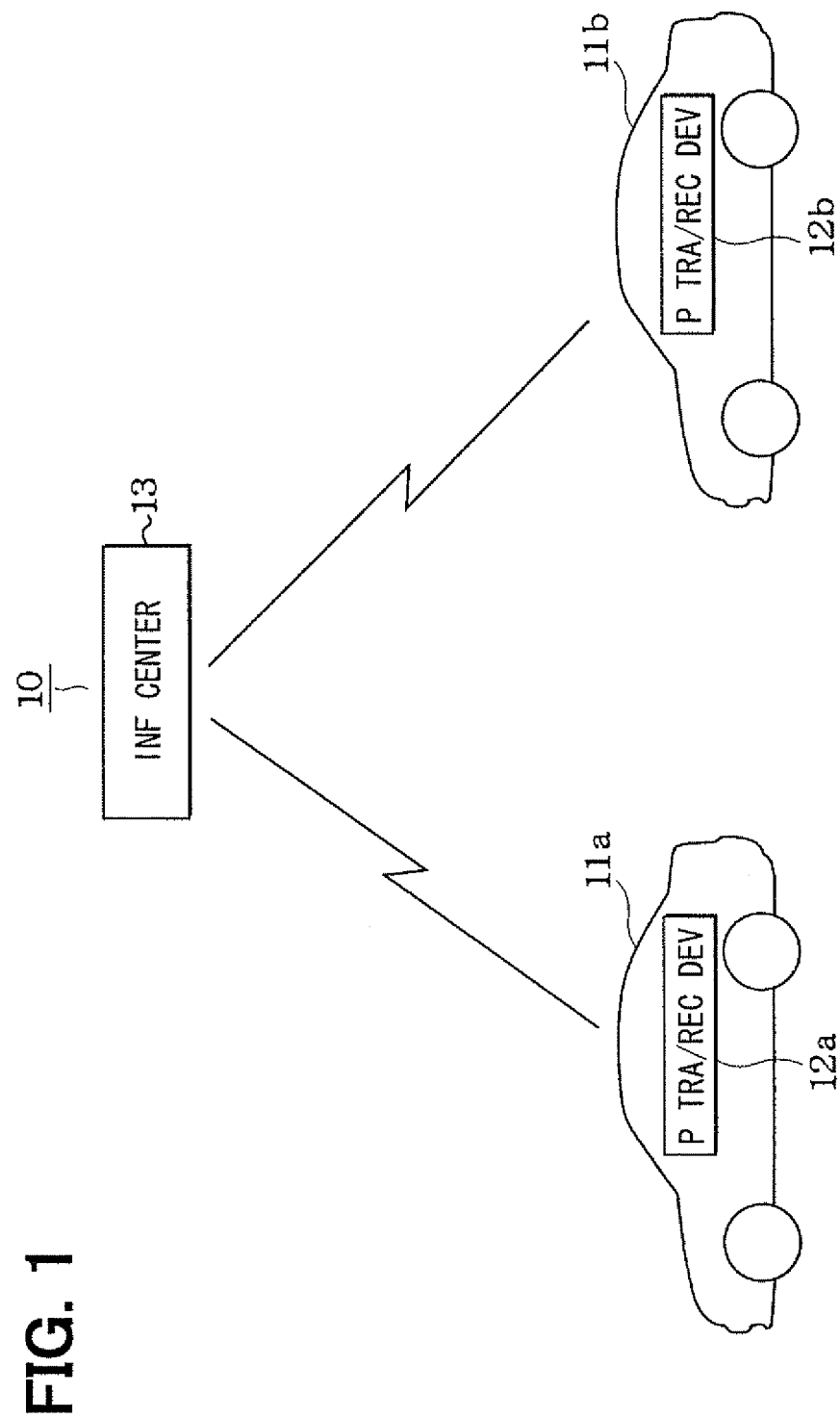
FIG. 1 is a diagram schematically showing an overall configuration of a power transmitting and receiving system for vehicle according to a first embodiment.

Hereinafter, a first embodiment will be described with reference to FIG. 1 through FIG. 16C. FIG. 1 is a view schematically showing chiefly an overall configuration of a power transmitting and receiving system 10 for vehicle.

The power transmitting and receiving system 10 includes power transmitting and receiving devices installed to respective vehicles (in this case, a power transmitting and receiving device 12a installed to an own vehicle 11a and a power transmitting and receiving device 12b installed to one other vehicle 11b) and an information center 13 capable of communicating with the power transmitting and receiving device 12a (12b) via a wireless communication channel.

Firstly, a configuration of the power transmitting and receiving device 12a (12b) will be described with reference to FIG. 2. Because the power transmitting and receiving device 12a and the power transmitting and receiving device 12b are of the same configuration, components forming the power transmitting and receiving device 12b are put in brackets in the following description of the configuration.

The power transmitting and receiving device 12a (12b) is formed of a main controller 14a (14b) as a core, a power control device 15a (15b), a positioning device 16a (16b), a display device 17a (17b), an in-vehicle speaker 18a (18b), a storage device 19a (19b), an antenna drive device 20a (20b), a running information detection system 21a (21b), a vehicle-vehicle power transmitting and receiving antenna 22a (22b) equivalent to power transmitting and receiving antenna, a vehicle-infrastructure power transmitting and receiving antenna 23a (23b), a vehicle-vehicle information communication antenna 24a (24b), a vehicle-center information communication antenna 25a (25b), and so forth.

The main controller 14a (14b) is chiefly formed of a CPU (not shown) and controls general operations of the power transmitting and receiving device 12a (12b). As the main controller 14a (14b) runs a power transmission and reception control program, the power transmitting and receiving device 12a (12b) virtually implements the following portions via software: a longitudinal inter-vehicle distance determination processing portion 31a (31b), a horizontal displacement amount determination processing portion 32a (32b), an information communication processing portion 33a (33b) equivalent to information communication means, an orientation specifying information transmission and reception processing portion 34a (34b) equivalent to orientation specifying information transmission and reception means, an antenna orientation change processing portion 35a (35b) equivalent to antenna orientation changing means, and a running control processing portion 36a (36b) equivalent to running control means.

The power control device 15a (15b) includes a power transmission and reception processing circuit, a power conversion processing circuit, and a state-of-charge monitoring circuit, none of which is shown herein. When power transmission and reception is performed (when power is transmitted and received) wirelessly between the own vehicle 11a and the other vehicle 11b, the power control device 15a (15b) sets a resonant frequency by changing a setting (circuit constant or the like) of the power transmission and reception processing circuit to be compatible with a frequency (power transmitting and receiving frequency) used for the power transmission and reception. Also, the power control device 15a (15b) converts power received from an outside source to a voltage (magnitude and waveform) suitable to charge an in-vehicle battery 41a (41b) by means of the power conversion processing circuit. Various power transmitting and receiving frequencies are under review for wireless power transmission and reception. Accordingly, the power conversion processing circuit performs conversion processing according to various power transmitting and receiving frequencies.

In a case where transmission and reception of a set amount of power fails, the power control device 15a (15b) records a difference between a set value (target value) and an actual value (an amount of actually transmitted and received power). The power control device 15a (15b) is also furnished with a function of controlling the in-vehicle battery 41a (41b) to operate in a stable manner by performing charge control on respective cells in the in-vehicle battery 41a (41b) to bring the respective cells in a proper charge balance. The power control device 15a (15b) monitors a state of the in-vehicle battery 41a (41b) on a cell-by-cell basis by means of the state-of-charge monitoring circuit and the state-of-charge monitoring circuit outputs abnormality information to the power control device 15a (15b) in the event of an abnormality in charge balance or temperature of the respective cells.

Figure 3:
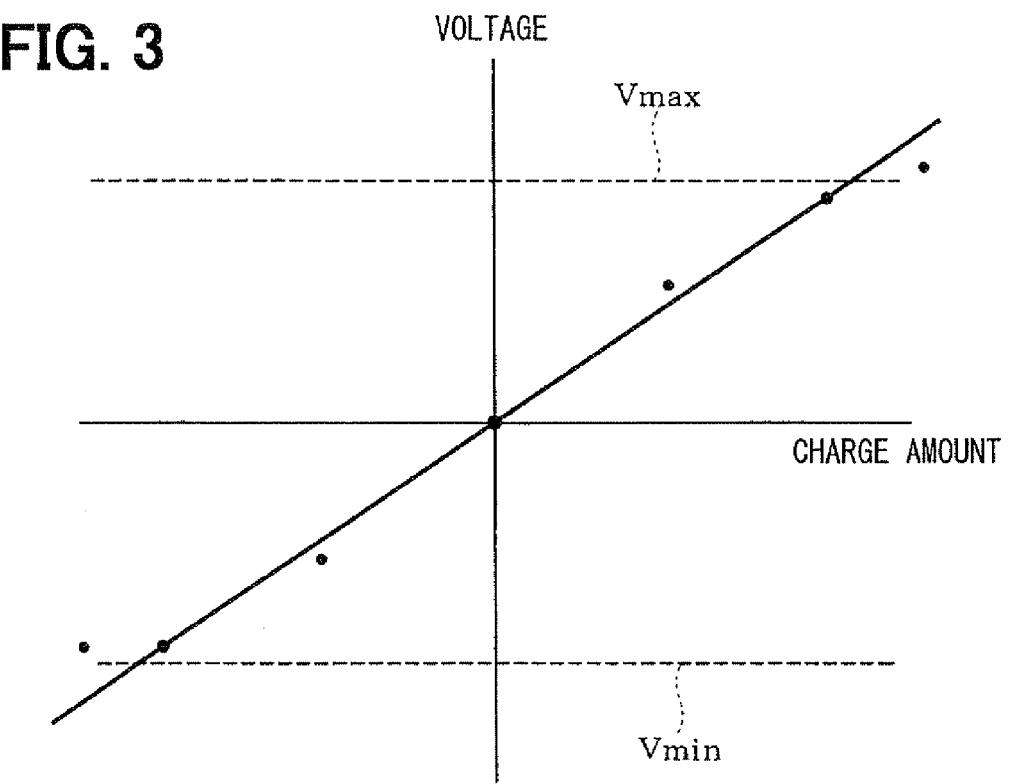
FIG. 3 is a diagram showing an example of charge and discharge characteristics of an in-vehicle battery.

The in-vehicle battery 41a (41b) has charge and discharge characteristics (a charge characteristic and a discharge characteristic) as is shown, for example, in FIG. 3. More specifically, the in-vehicle battery 41a (41b) has a region (a linear transition region) in which a voltage makes linear transitions between a maximum voltage value allowed as a voltage value (an amount of storage) after charging (a maximum allowable voltage value Vmax indicated by an alternate long and short dash line in FIG. 3) and a minimum voltage value allowed as a voltage value (an amount of storage) after discharging (a minimum allowable voltage value Vmin indicated by an alternate long and short dash line in FIG. 3). In a case where a state of charge of the in-vehicle battery 41a (41b) turns to a predetermined state, the power control device 15a (15b) performs a predetermined warning operation.

More specifically, when a voltage across the in-vehicle battery 41a (41b) nearly exceeds the maximum allowable voltage value Vmax, the power control device 15a (15b) performs a predetermined warning operation. In this case, the power control device 15a (15b) warns a driver of the vehicle 11a (11b) that charging of the in-vehicle battery 41a (41b) is stopped and discharging of the in-vehicle batter 41a (41b) is started by a display output on the display device 17a (17b) or a sound output from the in-vehicle speaker 18a (18b). Alternatively, it may be configured in such a manner that, with this warning operation, the power control device 15a (15b) automatically stops charging of the in-vehicle battery 41a (41b) and automatically starts discharging of the in-vehicle battery 41a (41b).

Also, when a voltage across the in-vehicle battery 41a (41b) nearly falls below the minimum allowable voltage value Vmin, the power control device 15a (15b) performs a predetermined warning operation. In this case, the power control device 15a (15b) warns a driver of the vehicle 11a (11b) that discharging of the in-vehicle battery 41a (41b) is stopped and charging of the in-vehicle battery 41a (41b) is started by a display output on the display device 17a (17b) or a sound output from the in-vehicle speaker 18a (18b). Alternatively, it may be configured in such a manner that, with this warning operation, the power control device 15a (15b) automatically stops discharging of the in-vehicle battery 41a (41b) and automatically starts charging of the in-vehicle battery 41a (41b).

Upon receipt of a satellite signal sent from an unillustrated positioning satellite (for example, a GPS satellite or a GLONASS satellite), the positioning device 16a (16b) performs an arithmetic operation (positioning) by extracting parameters from the satellite signal to acquire actual position information (information specifying an actual position) of the power transmitting and receiving device 12a (12b) and hence the vehicle 11a (11b) incorporating the power transmitting and receiving device 12a (12b). Also, the positioning device 16a (16b) is furnished with a dead-reckoning navigation function of estimating a moving direction of the vehicle 11a (11b) on the basis of detection values from unillustrated speed sensor and gyro sensor, and an external environment recognition function of recognizing traffic signs, buildings, and white road lines by analyzing an image captured by an unillustrated in-vehicle camera. By also using these functions, the positioning device 16a (16b) becomes able to determine an actual position of the power transmitting and receiving device 12a (12b) and hence the vehicle 11a (11b) incorporating the power transmitting and receiving device 12a (12b) at a high degree of accuracy.

The display device 17a (17b) is formed, for example, of a liquid crystal display, and according to a display output command signal inputted therein from the main controller 14a (14b), the display device 17a (17b) displays thereon various types of information corresponding to the display output command.

The in-vehicle speaker 18a (18b) is connected to the main controller 14a (14b) via an unillustrated sound controller, and according to a sound output command signal inputted therein from the main controller 14a (14b), the in-vehicle speaker 18a (18b) outputs various types of sound information corresponding to the sound output command.

The storage device 19a (19b) is formed of various storage media, such as a memory and a hard disk drive, and stores therein various types of data and information.

Figure 4:
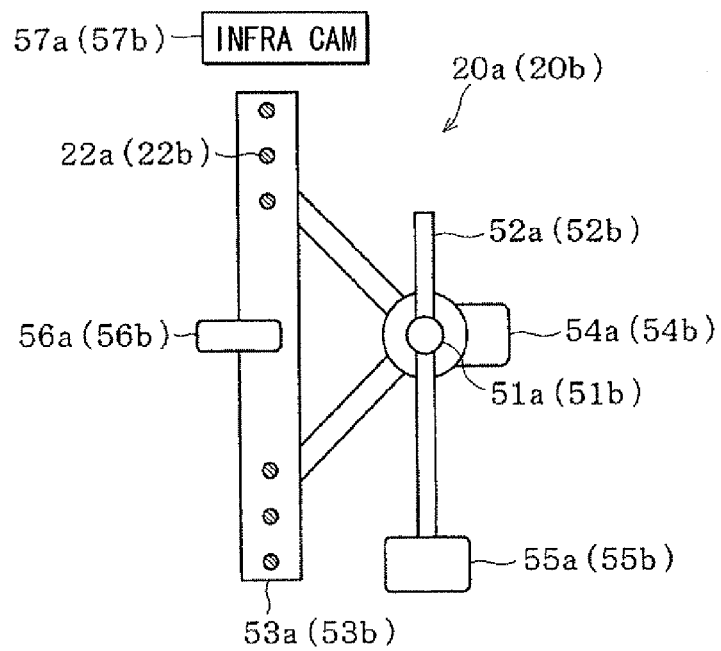
FIG. 4 is a diagram schematically showing a configuration of an antenna drive device.

As is shown in FIG. 4, the antenna drive device 20a (20b) changes an orientation of the coil-shaped vehicle-vehicle power transmitting and receiving antenna 22a (22b) about a horizontal axis 51a (51b) within a predetermined range in a vertical direction and about a vertical axis 52a (52b) within a predetermined range in a horizontal direction. In this case, the vehicle-vehicle power transmitting and receiving antenna 22a (22b) is housed in a protection case 53a (53b) used to protect the vehicle-vehicle power transmitting and receiving antenna 22a (22b). However, it may be configured in such a manner that the vehicle-vehicle power transmitting and receiving antenna 22a (22b) is not housed in the protection case 53a (53b).

The antenna drive device 20a (20b) includes a vertical actuator 54a (54b) and a horizontal actuator 55a (55b). The vertical actuator 54a (54b) changes an orientation of the vehicle-vehicle power transmitting and receiving antenna 22a (22b) within a predetermined range in a vertical direction by vertically turning the protection case 53a (53b) in which the vehicle-vehicle power transmitting and receiving antenna 22a (22b) is housed. Also, the horizontal actuator 55a (55b) changes an orientation of the vehicle-vehicle power transmitting and receiving antenna 22a (22b) within a predetermined range in a horizontal direction by horizontally turning the protection case 53a (53b) in which the vehicle-vehicle power transmitting and receiving antenna 22a (22b) is housed. In other words, the vertical actuator 54a (54b) and the horizontal actuator 55a (55b) change an orientation of the vehicle-vehicle power transmitting and receiving antenna 22a (22b) not directly but change an orientation of the vehicle-vehicle power transmitting and receiving antenna 22a (22b) indirectly via the protection case 53a (53b).

The antenna drive device 20a (20b) is provided with an unillustrated rotation angle sensor. An angle of rotation (an amount of turning in a vertical direction and an amount of turning in a horizontal direction) of the vehicle-vehicle power transmitting and receiving antenna 22a (22b) can be detected by this rotation angle sensor. The main controller 14a (14b) of the power transmitting and receiving device 12a (12b) recognizes an orientation of the vehicle-vehicle power transmitting and receiving antenna 22a (22b) on the basis of a detection value of this rotation angle sensor.

Also, a light-emitting device 56a (56b) equivalent to light-emitting means is installed at a center portion of the vehicle-vehicle power transmitting and receiving antenna 22a (22b). The light-emitting device 56a (56b) emits a spot of light having a directivity along an orientation of the vehicle-vehicle power transmitting and receiving antenna 22a (22b) (a normal to the coil-shaped vehicle-vehicle power transmitting and receiving antenna 22a (22b), leftward in a state shown in FIG. 4) from the center of the vehicle-vehicle power transmitting and receiving antenna 22a (22b). The light-emitting device 56a (56b) is installed on a surface (outer surface) of the protection case 53a (53b) in which the vehicle-vehicle power transmitting and receiving antenna 22a (22b) is housed. Hence, an orientation (light-emitting direction) of the light-emitting device 56a (56b) is also changed within a predetermined range in a vertical direction and within a predetermined range in a horizontal direction with the orientation of the vehicle-vehicle power transmitting and receiving antenna 22a (22b).

Also, an infrared camera 57a (57b) for use of antenna center detection is provided in the vicinity of the vehicle-vehicle power transmitting and receiving antenna 22a (22b). The infrared camera 57a (57b) is installed in such a manner that an image-capturing direction by an infrared ray is an outward direction (substantially leftward in FIG. 4) from the vehicle 11a (11b). The image-capturing direction of the infrared camera 57a (57b) is changeable within a predetermined range.

It may be configured in such a manner that the antenna drive device 20a (20b) as described above is provided also to antennas other than the vehicle-vehicle power transmitting and receiving antenna 22a (22b), such as the vehicle-infrastructure power transmitting and receiving antenna 23a (23b), the vehicle-vehicle information communication antenna 24a (24b), and the vehicle-center information communication antenna 25a (25b).

The running information detection system 21a (21b) has unillustrated various devices (for example, an engine control device, a brake control device, a transmission control device, and an in-vehicle camera device), unillustrated various sensors (for example, an acceleration sensor, a speed sensor, an accelerator sensor, and a seating sensor), and unillustrated various switches (for example, an accessory switch, an ignition switch, a door switch, and a door lock switch). The running information detection system 21a (21b) inputs various types of information detected by these devices, sensors, and switches into the main controller 14a (14b) as running information indicating a running condition of the vehicle.

The vehicle-vehicle power transmitting and receiving antenna 22a (22b) is formed in such a manner that an orientation thereof is changeable by the antenna drive device 20a (20b) as described above. From and at the vehicle-vehicle power transmitting and receiving antenna 22a (22b), power that the own vehicle 11a holds (power stored in the in-vehicle battery 41a of the own vehicle 11a) is transmitted wirelessly to the other vehicle 11b and/or power that the other vehicle 11b holds (power stored in the in-vehicle battery 41b of the other vehicle 11b) is received wirelessly by the own vehicle 11a.

Figure 2:
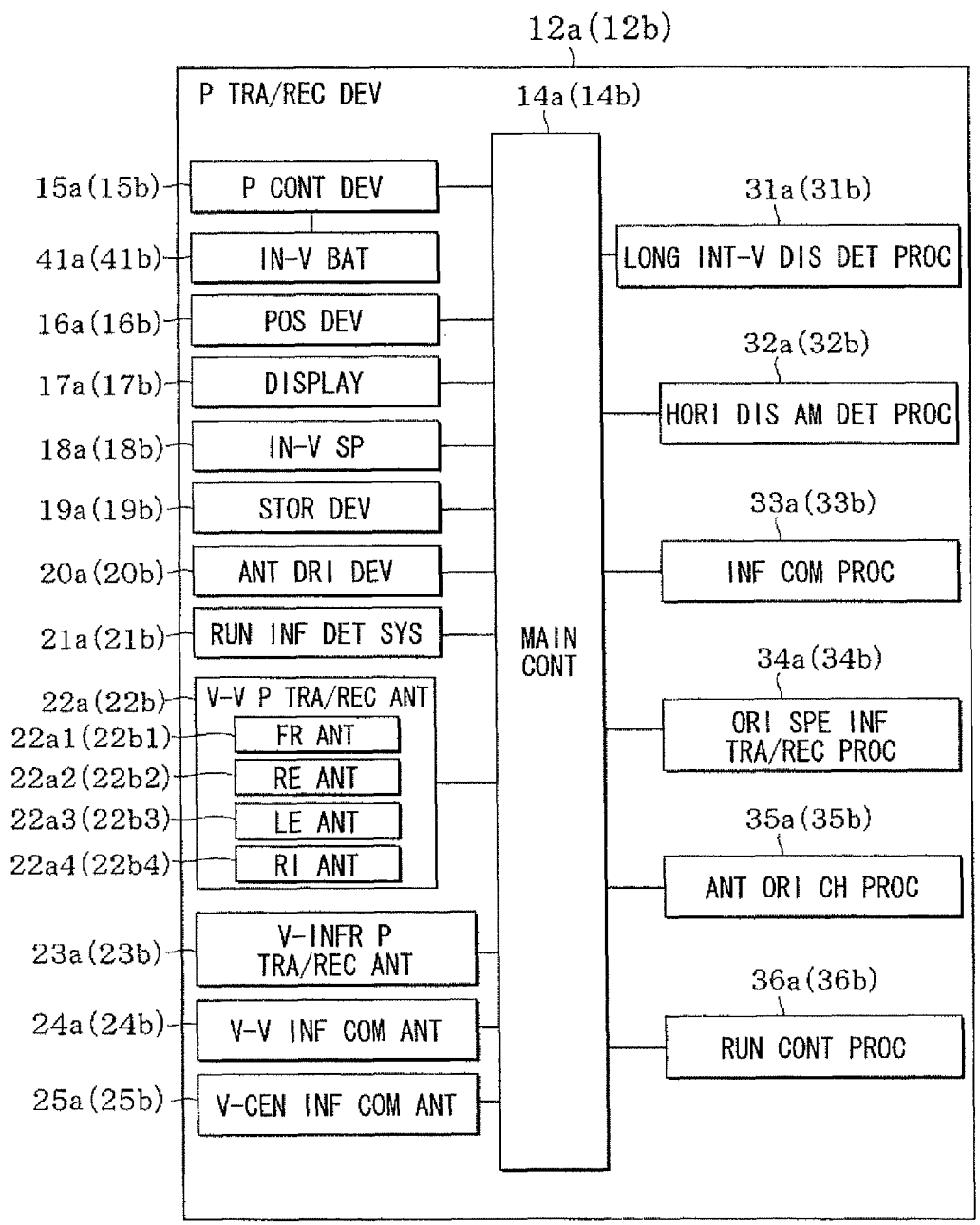
FIG. 2 is a functional block diagram schematically showing a configuration of the power transmitting and receiving device.

In this case, as is shown in FIG. 2, the following antennas are provided as the vehicle-vehicle power transmitting and receiving antenna 22a (22b): a front power transmitting and receiving antenna 22a1 (22b1) installed in a front portion (for example, an upper part of a front bumper) of the vehicle 11a (11b), a rear power transmitting and receiving antenna 22a2 (22b2) installed in a rear portion (for example, the inside of a door of a rear trunk) of the vehicle 11a (11b), a left power transmitting and receiving antenna 22a3 (22b3) installed in a left portion (for example, the inside of a left door) of the vehicle 11a (11b), and a right power transmitting and receiving antenna 22a4 (22b4) installed in a right portion (for example, the inside of a right door) of the vehicle 11a (11b). Herein, wireless power transmission and reception by the vehicle-vehicle power transmitting and receiving antenna 22a (22b) is performed by resonance induction.

The vehicle-infrastructure power transmitting and receiving antenna 23a (23b) performs wireless power transmission and reception between the vehicle 11a (11b) and unillustrated power transmitting and receiving facilities provided in various regions. In other words, the vehicle 11a (11b) can perform wireless power transmission and reception not only with the other vehicle but also with power transmitting and receiving devices provided in various regions as infrastructure facilities.

The vehicle-vehicle information communication antenna 24a (24b) enables a wireless exchange (transmission and reception) of various types of information between the vehicles 11a and 11b. Examples of information transmitted and received by the vehicle-vehicle information communication antenna 24a (24b) include but not limited to a vehicle ID allocated to the vehicle 11a (11b), actual position information of the vehicle 11a (11b), information on the vehicle-vehicle power transmitting and receiving antenna 22a (22b), a power transmission request signal requesting a supply (transmission) of power to the other vehicle, and a power reception request signal requesting a supply (reception) of power from the other vehicle. Examples of the information on the vehicle-vehicle power transmitting and receiving antenna 22a (22b) include but not limited to a size, a resistance value, impedance, and an amount of transceivable power (an allowable output value) of a coil forming the vehicle-vehicle power transmitting and receiving antenna 22a (22b).

It is preferable to adopt narrowed communications, for example, DSRC (Dedicated Short Range Communications), for communications by the vehicle-vehicle information communication antenna 24a (24b) because it becomes difficult for a communication failure, such as interference, to occur. By adopting communications using highly directional radio waves or light for communications by the vehicle-vehicle information communication antenna 24a (24b), it becomes possible to make it more difficult for a communication failure, such as interference, to occur.

The vehicle-center information communication antenna 25a (25b) enables an exchange (transmission and reception) of various types of information (state-of-charge specifying information, power transmission command information, and power reception command information, all of which will be described below) between the vehicle 11a (11b) and the information center 13 via a wireless communication channel.

The longitudinal inter-vehicle distance determination processing portion 31a (31b) determines a distance between the own vehicle 11a and the other vehicle 11b in front of or behind the own vehicle 11a (an inter-vehicle distance in a direction along a longitudinal direction or a moving direction of the vehicles) and outputs the determined distance (longitudinal inter-vehicle distance) as longitudinal inter-vehicle distance specifying information.

Figure 5:
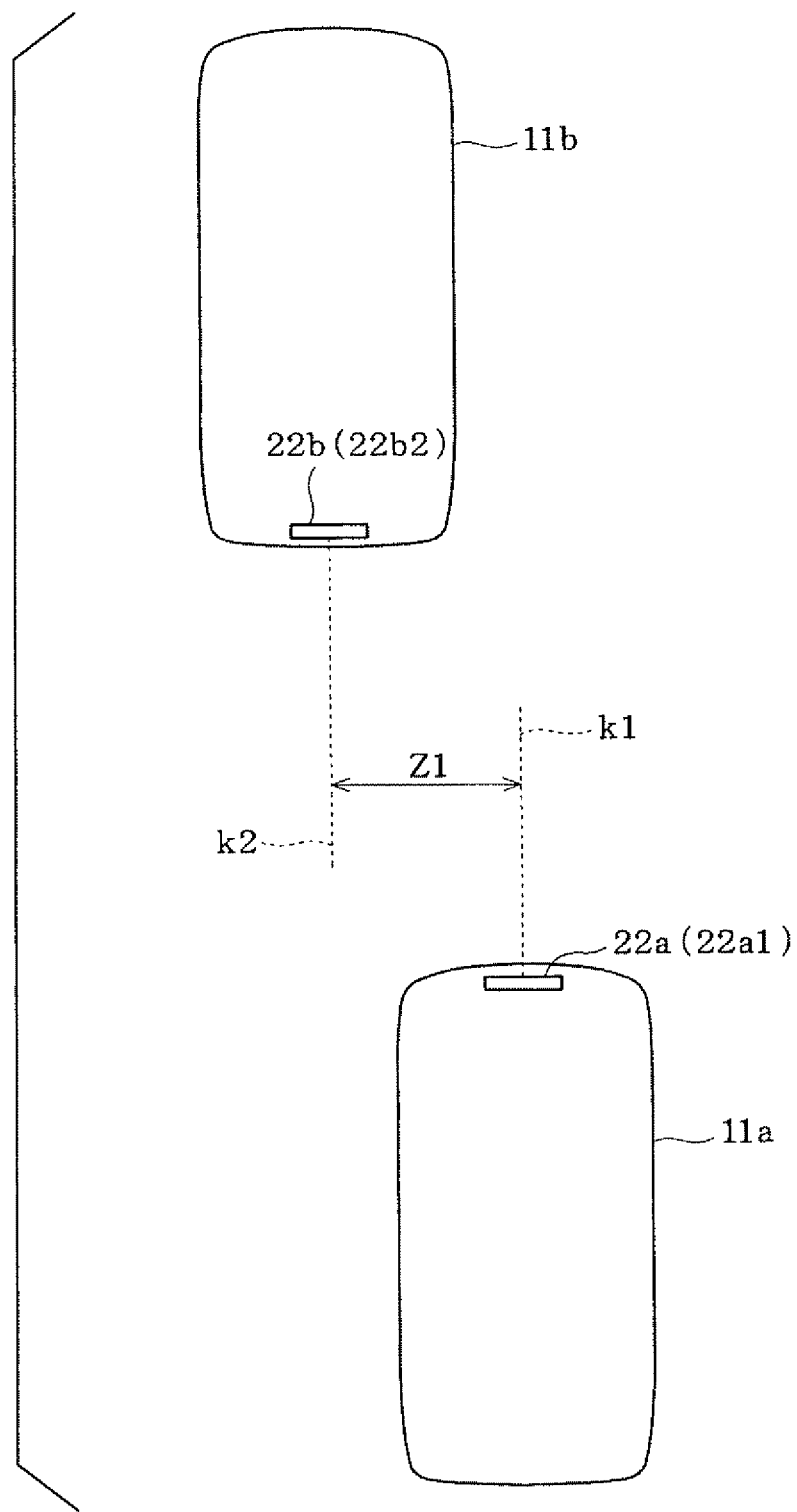
FIG. 5 is a diagram describing an amount of horizontal displacement (Part 1)

Various configurations can be adopted as a configuration to determine the longitudinal inter-vehicle distance. For example, it may be configured in such a manner that the longitudinal inter-vehicle distance determination processing portion 31a (31b) determines a longitudinal inter-vehicle distance on the basis of an actual position of the own vehicle 11a and an actual position of the other vehicle 11b. Alternatively, it may be configured in such a manner that the longitudinal inter-vehicle distance determination processing portion 31a (31b) determines a longitudinal inter-vehicle distance on the basis of a time taken by an electromagnetic wave outputted toward the other vehicle 11b (own vehicle 11a) from an unillustrated in-vehicle radar for use of longitudinal inter-vehicle distance determination or an ultrasonic wave outputted toward the other vehicle 11b (own vehicle 11a) from an unillustrated ultrasonic sensor for use of longitudinal inter-vehicle distance determination to reach the own vehicle 11a (other vehicle 11b) after reflection. In this case, it is preferable to install the in-vehicle radar and the ultrasonic sensor for use of longitudinal inter-vehicle distance determination in the vicinity of a surface of the front portion or the rear portion of the vehicle 11a (11b). Further, it may be configured in such a manner that the longitudinal inter-vehicle distance determination processing portion 31a (31b) determines a longitudinal inter-vehicle distance by analyzing an image captured by an unillustrated in-vehicle camera for use of longitudinal inter-vehicle distance determination The horizontal displacement amount determination processing portion 32a (32b) determines an amount of horizontal displacement between the own vehicle 11a and the other vehicle 11b and outputs the determined amount of displacement (an amount of horizontal displacement) as horizontal displacement amount specifying information. An amount of horizontal displacement referred to herein is defined as follows. That is, for example, assume that the front power transmitting and receiving antenna 22a1 (22b1) and the rear power transmitting and receiving antenna 22a2 (22b2) included in the vehicle-vehicle power transmitting and receiving antenna 22a (22b) are installed to the vehicle 11a (11b) at a center position in a horizontal direction. Also, assume that, as is shown in FIG. 5, the vehicle 11a is behind the vehicle 11b in a moving direction (upward in FIG. 5) of the vehicles 11a and 11b. Then, there is a distance Z1 between a reference line k1 extended frontward from a center portion of the vehicle 11a in a horizontal direction (herein, a center portion of the front power transmitting and receiving antenna 22a1 included in the vehicle-vehicle power transmitting and receiving antenna 22a) and a reference line k2 extended rearward from a center portion of the vehicle 11b in a horizontal direction (herein, a center portion of the rear power transmitting and receiving antenna 22b2 included in the vehicle-vehicle power transmitting and receiving antenna 22b). An amount of horizontal displacement means this distance Z1.

Figure 6:
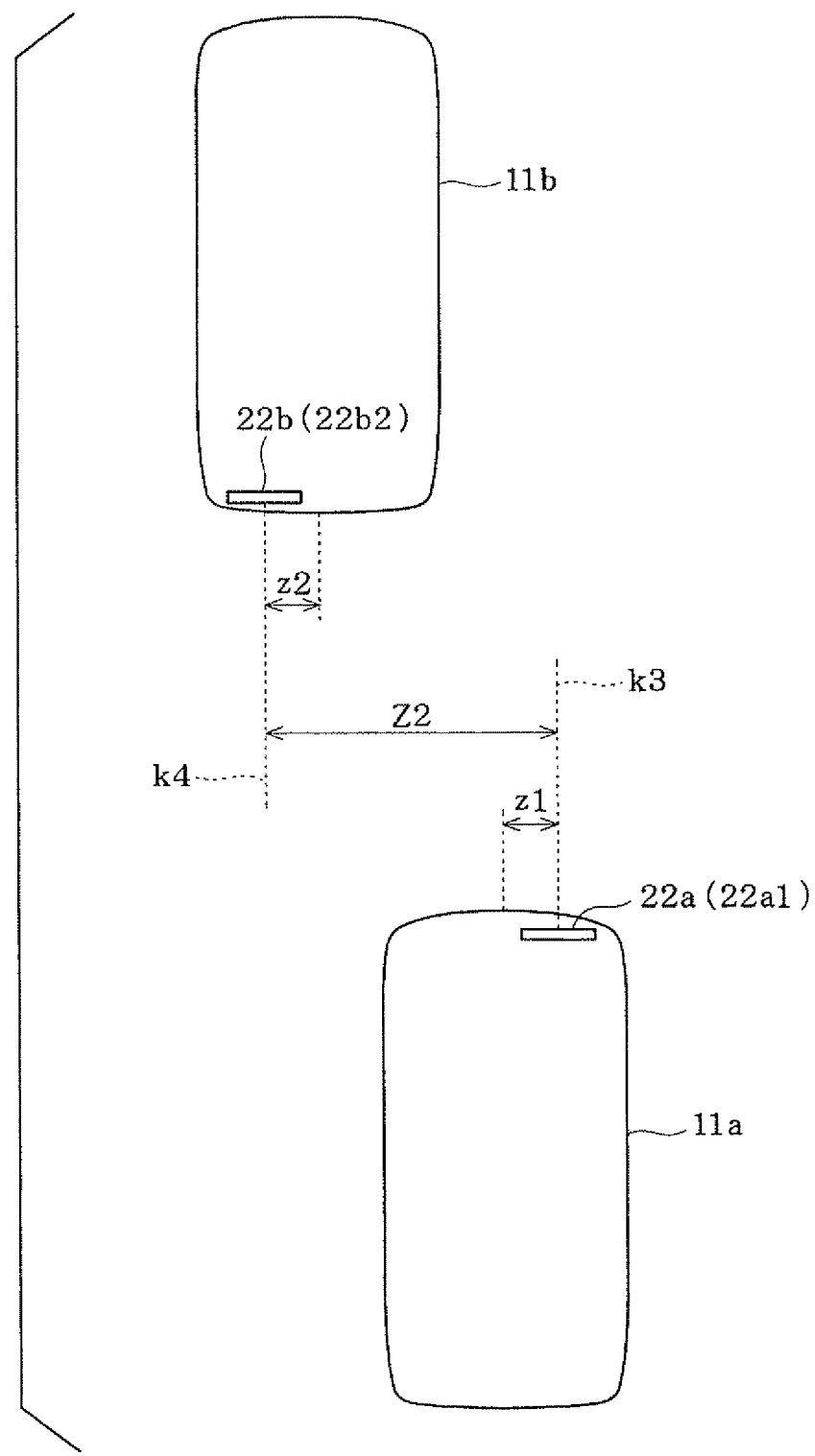
FIG. 6 is a diagram describing an amount of horizontal displacement (Part 2)

It should be noted that of the antennas included in the vehicle-vehicle power transmitting and receiving antenna 22a (22b), the front power transmitting and receiving antenna 22a1 (22b1) and the rear power transmitting and receiving antenna 22a2 (22b2) can be installed at a position displaced in a horizontal direction from the center position of the vehicle 11a (11b) in a horizontal direction. In this case, as is shown in FIG. 6, an amount of horizontal displacement means a distance Z2 between a reference line k3 extended frontward from the center portion of the front power transmitting and receiving antenna 22a1 included in the vehicle-vehicle power transmitting and receiving antenna 22a of the vehicle 11a and a reference line k4 extended rearward from the center portion of the rear power transmitting and receiving antenna 22b2 included in the vehicle-vehicle power transmitting and receiving antenna 22b of the vehicle 11b. More specifically, an amount of horizontal displacement, Z2, in this case is a distance including a distance z1 between the center position of the vehicle 11a in a horizontal direction and a position at which the vehicle-vehicle power transmitting and receiving antenna 22a (22a1) is installed to the vehicle 11a, and a distance z2 between the center position of the vehicle 11b in a horizontal direction and a position at which the vehicle-vehicle power transmitting and receiving antenna 22b (22b2) is installed to the vehicle 11b. Hence, the horizontal displacement amount specifying information is identified as information containing these distances z1 and z2.

Various configurations can be adopted as a configuration to determine an amount of horizontal displacement. For example, it may be configured in such a manner that the horizontal displacement amount determination processing portion 32a (32b) determines an amount of horizontal displacement on the basis of an actual position of the own vehicle 11a and an actual position of the other vehicle 11b. Alternatively, it may be configured in such a manner that the horizontal displacement amount determination processing portion 32a (32b) determines an amount of horizontal displacement on the basis of a time taken by an electromagnetic wave outputted toward the other vehicle 11b (own vehicle 11a) from an unillustrated in-vehicle radar for use of horizontal displacement amount determination or an ultrasonic wave outputted toward the other vehicle 11b (own vehicle 11a) from an unillustrated ultrasonic sensor for use of horizontal displacement amount determination to reach the own vehicle 11a (other vehicle 11b) after reflection. In this case, it is preferable to install the in-vehicle radar and the ultrasonic sensor for use of horizontal displacement amount determination in the vicinity of a surface of the front portion or the rear portion of the vehicle 11a (11b). Further, it may be configured in such a manner that the horizontal displacement amount determination processing portion 32a (32b) determines an amount of horizontal displacement by analyzing an image captured by an unillustrated in-vehicle camera for use of horizontal displacement amount determination. Moreover, it may be configured in such a manner that the in-vehicle radar, the ultrasonic sensor, and the in-vehicle camera for use of horizontal displacement amount determination are common, respectively, with the in-vehicle radar, the ultrasonic sensor, and the in-vehicle camera for use of longitudinal inter-vehicle distance determination.

The information communication processing portion 33a (33b) communicates with the other vehicle 11b (the own vehicle 11a) by transmitting information containing the longitudinal inter-vehicle distance specifying information determined by the longitudinal inter-vehicle distance determination processing portion 31a (31b) and the horizontal displacement amount specifying information determined by the horizontal displacement amount determination processing portion 32a (32b) as vehicle positional relation specifying information.

The orientation specifying information transmission and reception processing portion 34a transmits own vehicle antenna orientation specifying information specifying an orientation of the vehicle-vehicle power transmitting and receiving antenna 22a (an orientation of at least one antenna selected from the power transmitting and receiving antennas 22a1 through 22a4) provided to the own vehicle 11a to the other vehicle 11b. Also, the orientation specifying information transmission and reception processing portion 34a receives the own vehicle antenna orientation specifying information received at the orientation specifying information transmission and reception processing portion 34b provided to the other vehicle 11b, that is, information specifying an orientation of the vehicle-vehicle power transmitting and receiving antenna 22b (an orientation of at least one antenna selected from the power transmitting and receiving antennas 22b1 through 22b4) provided to the other vehicle 11b as other vehicle antenna orientation specifying information. It should be noted that the orientation specifying information transmission and reception processing portion 34b provided to the other vehicle 11b operates in the same manner as the orientation specifying information transmission and reception processing portion 34a provided to the own vehicle 11a when the other vehicle 11b is switched to the own vehicle and the own vehicle 11a to the other vehicle.

The antenna orientation change processing portion 35a changes an orientation of the vehicle-vehicle power transmitting and receiving antenna 22a provided to the own vehicle 11a on the basis of the vehicle positional relation specifying information, the own vehicle antenna orientation specifying information, and the other vehicle antenna orientation specifying information, so that the vehicle-vehicle power transmitting and receiving antenna 22a (at least one antenna selected from the power transmitting and receiving antennas 22a1 through 22a4) provided to the own vehicle 11a and the vehicle-vehicle power transmitting and receiving antenna 22b (at least one antenna selected from the power transmitting and receiving antennas 22b1 through 22b4) provided to the other vehicle 11b mutually oppose. In addition, by transmitting an orientation change command signal to the other vehicle 11b, it also becomes possible for the antenna orientation change processing portion 35a to change an orientation of the vehicle-vehicle power transmitting and receiving antenna 22b provided to the other vehicle 11b so that the vehicle-vehicle power transmitting and receiving antenna 22a provided to the own vehicle 11a and the vehicle-vehicle power transmitting and receiving antenna 22b provided to the other vehicle 11b mutually oppose. It should be appreciated that the antenna orientation change processing portion 35b provided to the other vehicle 11b operates in the same manner as the antenna orientation change processing portion 35a provided to the own vehicle 11a when the other vehicle 11b is switched to the own vehicle and the own vehicle 11a to the other vehicle.

The running control processing portion 36a controls running of the own vehicle 11a, so that a spot of light emitted from the light-emitting device 56a provided to the own vehicle 11a falls on the center portion of the vehicle-vehicle power transmitting and receiving antenna 22b (any antenna selected from the power transmitting and receiving antennas 22b1 through 22b4) provided to the other vehicle 11b or a spot of light emitted from the light-emitting device 56b provided to the other vehicle 11b falls on the center portion of the vehicle-vehicle power transmitting and receiving antenna 22a (any antenna selected from the power transmitting and receiving antennas 22a1 through 22a4) provided to the own vehicle 11a. In addition, by transmitting a running control command signal to the other vehicle 11b, it also becomes possible for the running control processing portion 36a to control running of the other vehicle 11b, so that a spot of light emitted from the light-emitting device 56a provided to the own vehicle 11a falls on the center portion of the vehicle-vehicle power transmitting and receiving antenna 22b provided to the other vehicle 11b or a spot of light emitted from the light-emitting device 56b provided to the other vehicle 11b falls on the center portion of the vehicle-vehicle power transmitting and receiving antenna 22a provided to the own vehicle 11a.

Also, the running control processing portion 36a is configured to automatically control the running of the own vehicle 11a and the running of the other vehicle 11b while wireless power transmission and reception by the vehicle-vehicle power transmitting and receiving antenna 22a (22b) is performed. It should be appreciated that the running control processing portion 36b provided to the other vehicle 11b operates in the same manner as the running control processing portion 36a provided to the own vehicle 11a when the other vehicle 11b is switched to the own vehicle and the own vehicle 11a to the other vehicle.

A description will now be given to a configuration for the running control processing portion 36a (36b) to recognize the center portion of the vehicle-vehicle power transmitting and receiving antenna 22b (22a) provided to the other vehicle 11b (own vehicle 11a) with reference to FIG. 7.

Figure 7:
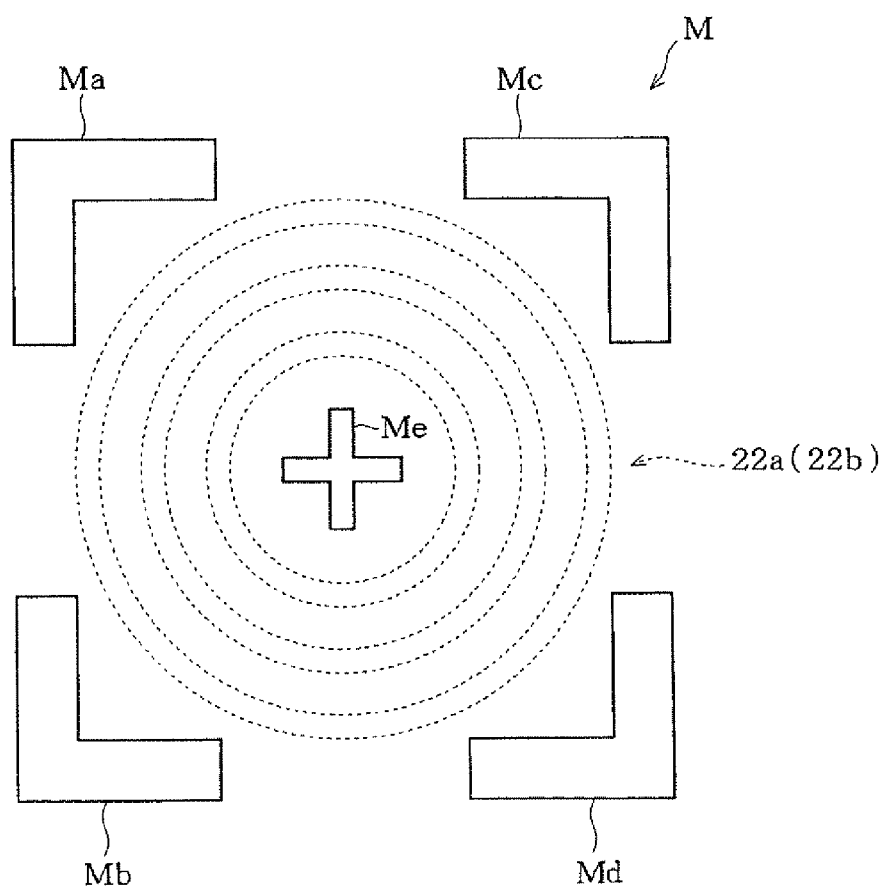
FIG. 7 is a diagram showing an example of a configuration to recognize a center portion of a vehicle-vehicle power transmitting and receiving antenna (Part 1)

That is, as is shown in FIG. 7, a marking M for use of antenna center position detection is provided to each vehicle 11a (11b) on a surface of a vehicle body corresponding to a portion in which the vehicle-vehicle power transmitting and receiving antenna 22a (22b) is built in (for example, a surface of the upper part of the front bumper, a surface of the door of the rear trunk, a surface of the left door, or a surface of the right door). The marking M is formed of a plurality of marking segments Ma through Me. More specifically, in this case, the marking M is formed of four corner segments Ma through Md provided so as to surround the periphery of the vehicle-vehicle power transmitting and receiving antenna 22a (22b) (when the vehicle-vehicle power transmitting and receiving antenna 22a (22b) is viewed from outside the vehicle 11a (11b), the corner segment Ma is located at the upper left corner, the corner segment Mb is located at the lower left corner, the corner segment Mc is located at the upper right corner, and the corner segment Md is located at the lower right corner) and a cross-shaped center segment Me provided at a center portion of a region surrounded by these four corner segments Ma through Md.

The vehicle-vehicle power transmitting and receiving antenna 22a (22b) is installed so that the center portion thereof (a turning center portion in vertical and horizontal directions) is superimposed on the center position of the region surrounded by a plurality of the corner segments Ma through Md or the center portion opposes the center segment Me. A special coating material (for example, a coating material recognizable by the infrared camera 57a (57b) of the antenna drive device 20a (20b), that is, a coating material invisible to humans) is applied on a part of a plurality of the surrounding corner segments Ma through Md (in this case, the corner segments Ma through Mc at the upper left corner, the lower left corner, and the upper right corner) and the center segment Me at the center. On the other hand, the special coating material is not applied on the remaining corner segment Md at the lower right corner.

In this manner, the main controller 14a (14b) recognizes the position of the marking M (corner segments Ma through Md) provided to each vehicle 11b (11a) by means of the infrared camera 57a (57b). Further, the main controller 14a (14b) recognizes the center position (the position of the center segment Me) of the recognized marking M (the region surrounded by the corner segments Ma through Md) as the center position (the turning center position in vertical and horizontal directions) of the vehicle-vehicle power transmitting and receiving antenna 22a (22b). Also, because the infrared-recognizable special coating material is applied only on a part of the marking M (in this case, the corner segments Ma through Mc and the center segment Me) and the special coating material is not applied on the remaining portion (in this case, the corner segment Md), it also becomes possible for the main controller 14a (14b) to recognize a vertical direction and a horizontal direction of the vehicle-vehicle power transmitting and receiving antenna 22a (22b) on the basis of a positional relation between the segments (in this case, the corner segments Ma through Mc) recognized and the segment (in this case, the corner segment Md) unrecognized by the infrared camera 57a (57b). Accordingly, the main controller 14a (14b) controls the running of the vehicle 11a (11b) in such a manner that a spot of light emitted from the light-emitting device 56a falls on the center portion of the vehicle-vehicle power transmitting and receiving antenna 22b (22a) recognized as above.

It should be appreciated that the configuration (for example, the number or the located positions of the segments) and the shape of the marking and the positions of the segments on which to apply the special coating material can be changed as needed.

In a case where not the running of the own vehicle 11a but the running of the other vehicle 11b is controlled so that a spot of light emitted from the vehicle 11a (11b) falls on the center portion of the vehicle-vehicle power transmitting and receiving antenna 22b (22a), for example, a configuration as follows can be adopted as a configuration to recognize the center portion of the vehicle-vehicle power transmitting and receiving antenna 22b (22a).

Figure 8:
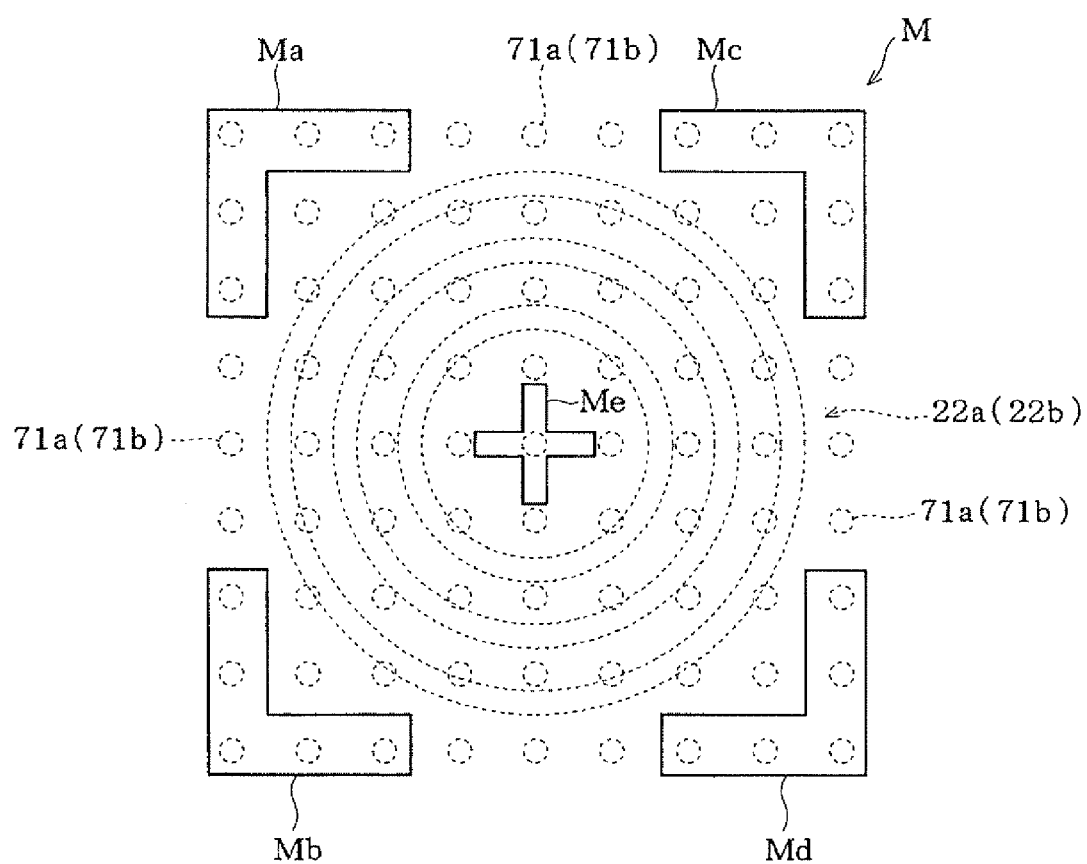
FIG. 8 is a diagram showing another example of the configuration to recognize the center portion of the vehicle-vehicle power transmitting and receiving antenna (Part 2)

That is, as is shown in FIG. 8, a plurality of light sensors 71a (71b) responsive to a spot of light emitted from the light-emitting device 56b (56a) of the other vehicle 11b are provided to the vehicle 11a (11b) so as to entirely cover the vehicle-vehicle power transmitting and receiving antenna 22a (22b). Then, the main controller 14a (14b) of the vehicle 11a (11b) controls the light-emitting device 56a (56b) to emit a spot of light toward the vehicle-vehicle power transmitting and receiving antenna 22b (22a) of the other vehicle 11b (11a). Meanwhile, the main controller 14b (14a) of the vehicle 11b (11a) recognizes an irradiation position of the spot of light emitted from the vehicle 11a (11b) on the basis of the position of any light sensor 71b (71a) having responded to the spot of light from the other vehicle 11a (11b). Then, the main controller 14b (14a) controls the running of the vehicle 11b (11a) in such a manner that the light sensor 71b (71a) corresponding to the center portion of the vehicle-vehicle power transmitting and receiving antenna 22b (22a) responds to the spot of light emitted from the vehicle 11a (11b), that is, an irradiation position of the spot of light emitted from the vehicle 11a (11b) falls on the center position of the vehicle-vehicle power transmitting and receiving antenna 22b (22a). In this case, too, it is recommendable that the marking M as described above is provided so as to cover a range across which the light sensors 71a (71b) are disposed. This is because the marking M makes it possible to recognize the region across which the light sensors 71a (71b) are disposed, that is, the region in which the vehicle-vehicle power transmitting and receiving antenna 22a (22b) is installed.

Figure 9:
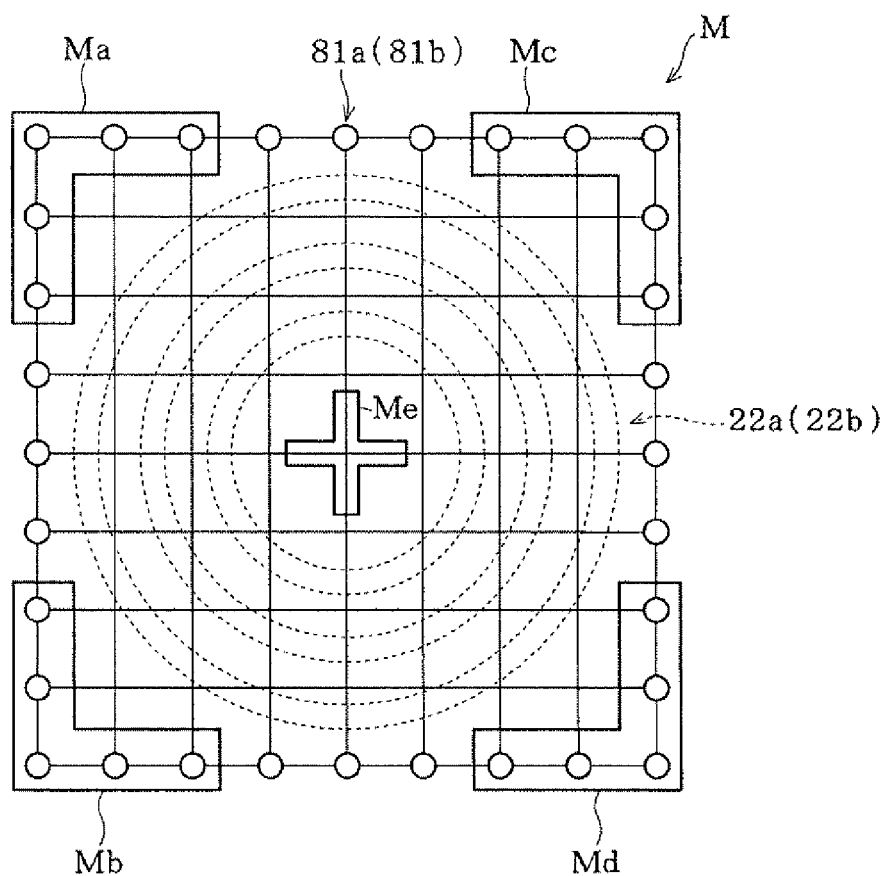
FIG. 9 is a diagram showing still another example of the configuration to recognize the center portion of the vehicle-vehicle power transmitting and receiving antenna (Part 3)

Also, as is shown in FIG. 9, it may be configured in such a manner that electrodes 81a (81b) responsive to a spot of light emitted from the light-emitting device 56b (56b) of the other vehicle 11b are disposed so as to entirely cover the vehicle-vehicle power transmitting and receiving antenna 22a (22b) instead of the light sensors 71a (71b). In this case, it is recommendable that the electrodes 81a (81b) are formed in such a manner that surface electrodes and back electrodes are arrayed in a vertical direction and a horizontal direction, so that an irradiation position of a spot of light from the vehicle 11a (11b) is recognized by scanning an electrode having responded to the spot of light from the vehicle 11a (11b).

Figure 10:
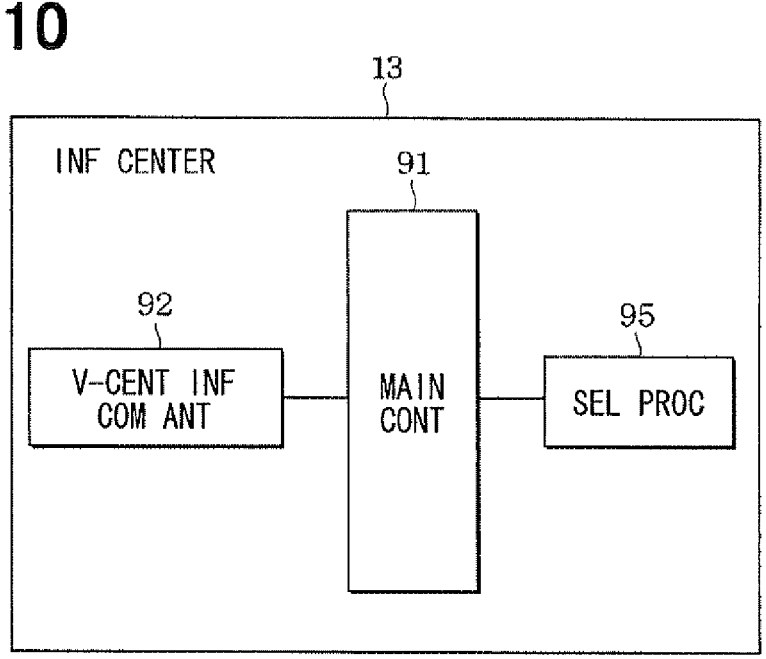
FIG. 10 is a functional block diagram schematically showing a configuration of an information center.

A configuration of the information center 13 will now be described with reference to FIG. 10.

The information center 13 is formed of a main controller 91 as a core and a vehicle-center information communication antenna 92 and the like. The main controller 91 is chiefly formed of a CPU (not shown) and controls general operations of the information center 13. Also, the information center 13 virtually implements a selection processing portion 95 equivalent to selection means via software as the main controller 91 runs a system control program.

The vehicle-center information communication antenna 92 enables transmission and reception of various types of information (such as state-of-charge specifying information, power transmission command information, and power reception command information, all of which will be described below) between the information center 13 and the vehicle 11a (11b) via a wireless communication channel.

The selection processing portion 95 selects a vehicle that transmits power (power-transmitter vehicle) and/or a vehicle that receives power (power-receiver vehicle) from the own vehicle 11a and the other vehicle 11b. More specifically, the selection processing portion 95 receives state-of-charge specifying information (information specifying a state of charge of the in-vehicle battery 41a (41b)) from the own vehicle 11a and the other vehicle 11b and compares the state of charge of the in-vehicle battery 41a of the own vehicle 11a with that of the in-vehicle battery 41(b) of the other vehicle (11b) on the basis of the state-of-charge specifying signal. The selection processing portion 95 selects either the own vehicle 11a or the other vehicle 11b, whichever has more power to spare (the vehicle having the larger amount of charge), as the power-transmitter vehicle and selects the other in which power is becoming low (the vehicle having the smaller amount of charge) as the power-receiver vehicle. The main controller 91 transmits the power transmission command information to the vehicle selected as the power-transmitter vehicle from the own vehicle 11a and the other vehicle 11b and transmits the power reception command information to the vehicle selected as the power-receiver vehicle.

Alternatively, it may be configured in such a manner that the selection processing portion 95 selects the power-transmitter vehicle (or the power-receiver vehicle) alone from the own vehicle 11a and the other vehicle 11b and the main controller 91 transmits power transmission command information (or power reception command information) to the selected power-transmitter vehicle (or the power-receiver vehicle) alone. In this case, for example, it may be configured in such a manner that the vehicle selected as the power-transmitter vehicle (or the power-receiver vehicle) transmits a power transmission request signal (or a power reception request signal) to the other vehicle, that is, the vehicle that is not selected as the power-transmitter vehicle (or the power-receiver vehicle), and the other vehicle is triggered to automatically operate as the power-receiver vehicle (or the power-transmitter vehicle) upon receipt of the power transmission request signal (or the power reception request signal).

In order to make it easier to maintain the positional relation between the power-transmitter vehicle and the power-receiver vehicle, it is desirable to perform the vehicle-vehicle (inter-vehicle) wireless power transmission and reception described above while the respective vehicles are running on a straight road. To this end, it is recommendable to provide a power transmitting and receiving area formed of straight roadways at various points along the road, so that vehicle-vehicle wireless power transmission and reception is performed while each vehicle is running within the power transmitting and receiving area. The power transmitting and receiving area will now be described with reference to FIG. 11.

Figure 11:
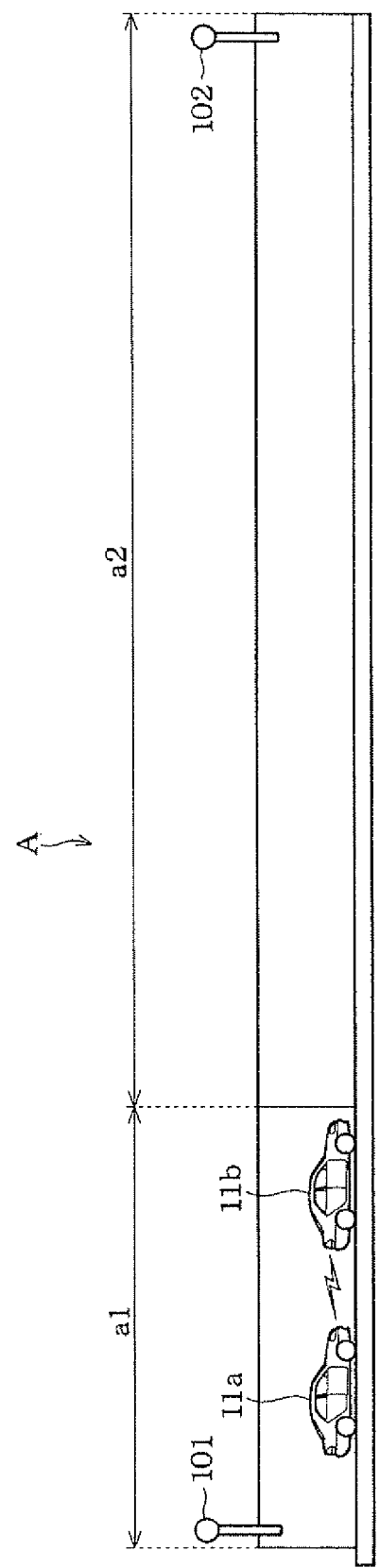
FIG. 11 is a diagram schematically showing a configuration of a power transmitting and receiving area (Part 1)

As is shown in FIG. 11, a power transmitting and receiving area A is formed of a running adjustment zone a1 and a running control zone a2. At a start point of the power transmitting and receiving area A, a vehicle detector 101 that detects an incoming vehicle entering the power transmitting and receiving area A is provided. At an end point of the power transmitting and receiving area A, a vehicle detector 102 that detects an outgoing vehicle leaving from the power transmitting and receiving area A is provided. The running adjustment zone a1 is provided on the entrance side of the power transmitting and receiving area A. The running control zone a2 is all the rest of the power transmitting and receiving area A except for the running adjustment zone a1 (a portion on the exit side).

The vehicle detector 101 for incoming vehicle detection is formed of a sensor or a camera to detect a vehicle. When a vehicle enters the power transmitting and receiving area A (running adjustment zone a1), the vehicle detector 101 transmits incoming vehicle detection information to the information center 13. The incoming vehicle detection information contains information on a vehicle ID, an entrance time, a running speed, and a state of storage (amount of storage) of the in-vehicle battery of the detected vehicle as information on the detected incoming vehicle.

Also, the vehicle detector 102 for outgoing vehicle detection is formed of a sensor or a camera to detect a vehicle. When a vehicle leaves from the power transmitting and receiving area A, the vehicle detector 102 transmits outgoing vehicle detection information to the information center 13. The outgoing vehicle detection information includes information on a vehicle ID, an exit time, and a state of storage (amount of storage) of the in-vehicle battery of the detected vehicle as information on the detected outgoing vehicle. The main controller 91 of the information center 13 is configured to control the selection processing portion 95 to perform the selection processing as described above on the vehicle (incoming vehicle) detected by the vehicle detector 101 for incoming vehicle detection. Also, the incoming vehicle is triggered to transmit the vehicle information of its own to the information center 13 when detected by the vehicle detector 101 for incoming vehicle detection.

Figure 12:
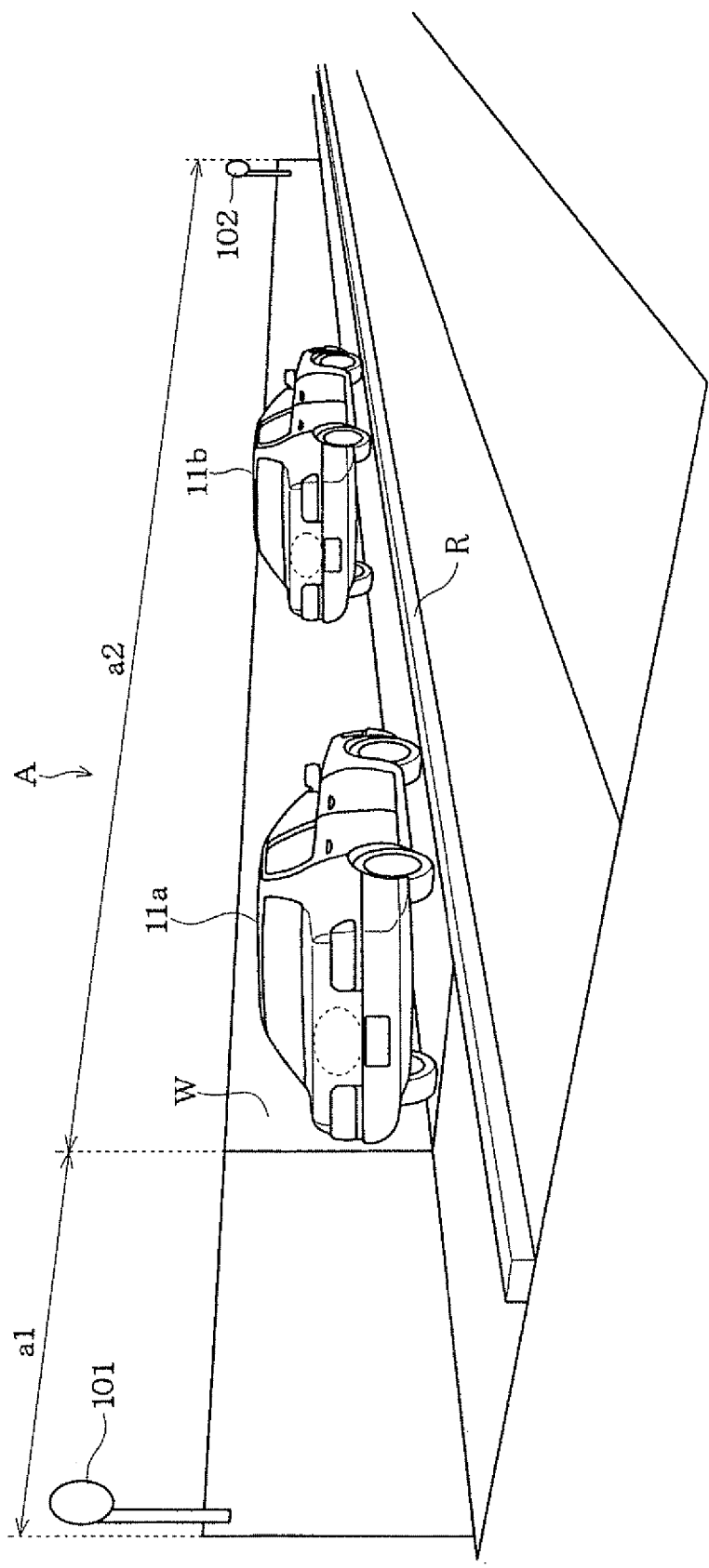
FIG. 12 is a diagram schematically showing a configuration of the power transmitting and receiving area (Part 2)

It is recommendable to form the power transmitting and receiving area A, for example, as is shown in FIG. 12. More specifically, the power transmitting and receiving area A is formed by utilizing an outermost lane (a lane most distant from the center) of the road. Also, a side wall W and a lane-changing preventing rail R both extending linearly along the power transmitting and receiving area A are provided respectively on the both sides of the power transmitting and receiving area A. Owing to this configuration, it becomes easier for a vehicle running within the power transmitting and receiving area A to run straight without deviating from the power transmitting and receiving area A. It should be appreciated that the side wall W and the lane-changing preventing rail R may be replaced by guardrails extending linearly along the power transmitting and receiving area A.

An operation of the power transmitting and receiving system 10 for vehicle configured as above will now be described with reference to FIG. 13.

The main controller 14a (14b) of the power transmitting and receiving device 12a (12b) incorporated into the vehicle 11a (11b) transmits the vehicle information of the corresponding vehicle 11a (11b) to the information center 13 when the vehicle 11a (11b) enters the running adjustment zone a1 of the power transmitting and receiving area A (Steps A1 and B1). The vehicle information contains a vehicle ID allocated to the vehicle 11a (11b), actual position information of the vehicle 11a (11b) determined by the positioning device 16a (16b), running information of the vehicle 11a (11b) detected by the running information detection system 21a (21b), state-of-charge specifying information specifying a state of charge of the in-vehicle battery 41a (41b) incorporated in the vehicle 11a (11b), antenna orientation information specifying a present-time orientation of the vehicle-vehicle power transmitting and receiving antenna 22a (22b) incorporated into the vehicle 11a (11b).

Meanwhile, upon receipt of the vehicle information from the vehicle 11a (11b), the main controller 91 of the information center 13 extracts the state-of-charge specifying information from the received vehicle information on the vehicle 11a (11b). On the basis of the state-of-charge specifying information, the main controller 91 understands the state of charge of the in-vehicle battery 41a (41b) of the vehicle 11a (11b) (Step C1). The main controller 91 then compares the state of charge of the in-vehicle battery 41a of the own vehicle 11a with that of the in-vehicle battery 41b of the other vehicle 11b. On the basis of a comparison result, the main controller 91 selects either the vehicle 11a or 11b, whichever has more power to spare (vehicle having the larger amount of charge) as the power-transmitter vehicle and selects the other in which power is becoming low (vehicle having the smaller amount of charge) as the power-receiver vehicle (Step C2). Herein, a description will be given to a case where, as are shown in FIG. 11 and FIG. 12, the own vehicle 11a behind the other vehicle 11b, that is, the vehicle 11a that entered the power transmitting and receiving area A (running adjustment zone a1) after the other vehicle 11b is selected as the power-transmitter vehicle having power to spare, and the other vehicle 11b in front of the own vehicle 11a, that is, the other vehicle 11b that entered the power transmitting and receiving area A (running adjustment zone a1) before the own vehicle 11a is selected as the power-receiver vehicle in which power is becoming low.

The main controller 91 of the information center 13 transmits the power transmission command information to the vehicle selected as the power-transmitter vehicle (in this case, the own vehicle 11a) and transmits the power reception command information to the vehicle selected as the power-receiver vehicle (in this case, the other vehicle 11b) (Step C3).

At the end of the own vehicle 11a having received the power transmission command information, the main controller 14a of the power transmitting and receiving device 12a performs power transmission preparation processing (Steps A2 through A4). In the power transmission preparation processing, the main controller 14a first transmits power-transmitter vehicle confirmation information indicating that the own vehicle 11a is confirmed (selected) as the power-transmitter vehicle (Step A2) and waits for a response from the power-receiver vehicle (reception of power-receiver vehicle confirmation information described below).

Meanwhile, at the end of the other vehicle 11b having received the power reception command information, the main controller 14b of the power transmitting and receiving device 12b performs power reception preparation processing (Steps B2 through B5). In the power reception preparation processing, the main controller 14b first transmits power-receiver vehicle confirmation information indicating that the other vehicle 11b is confirmed (selected) as the power-receiver vehicle (Step B2) and waits for a response from the power-transmitter vehicle (power-transmitter vehicle confirmation information). Then, upon receipt of the power-transmitter vehicle confirmation information from the power-transmitter vehicle (in this case, the own vehicle 11a), the main controller 14b recognizes the own vehicle 11a as being the power-transmitter vehicle and transmits the vehicle information of the other vehicle 11b (vehicle ID, actual position information, running information, state-of-charge specifying information, antenna orientation information, and the like) to the own vehicle 11a (Step B3). The main controller 14b then shifts to antenna orientation adjustment processing (Step B4) described below.

Meanwhile, at the end of the own vehicle 11a, the main controller 14a of the power transmitting and receiving device 12a shifts to antenna orientation adjustment processing upon receipt of the vehicle information from the power-receiver vehicle (in this case, the other vehicle 11b) (Step A3).

Figure 14:
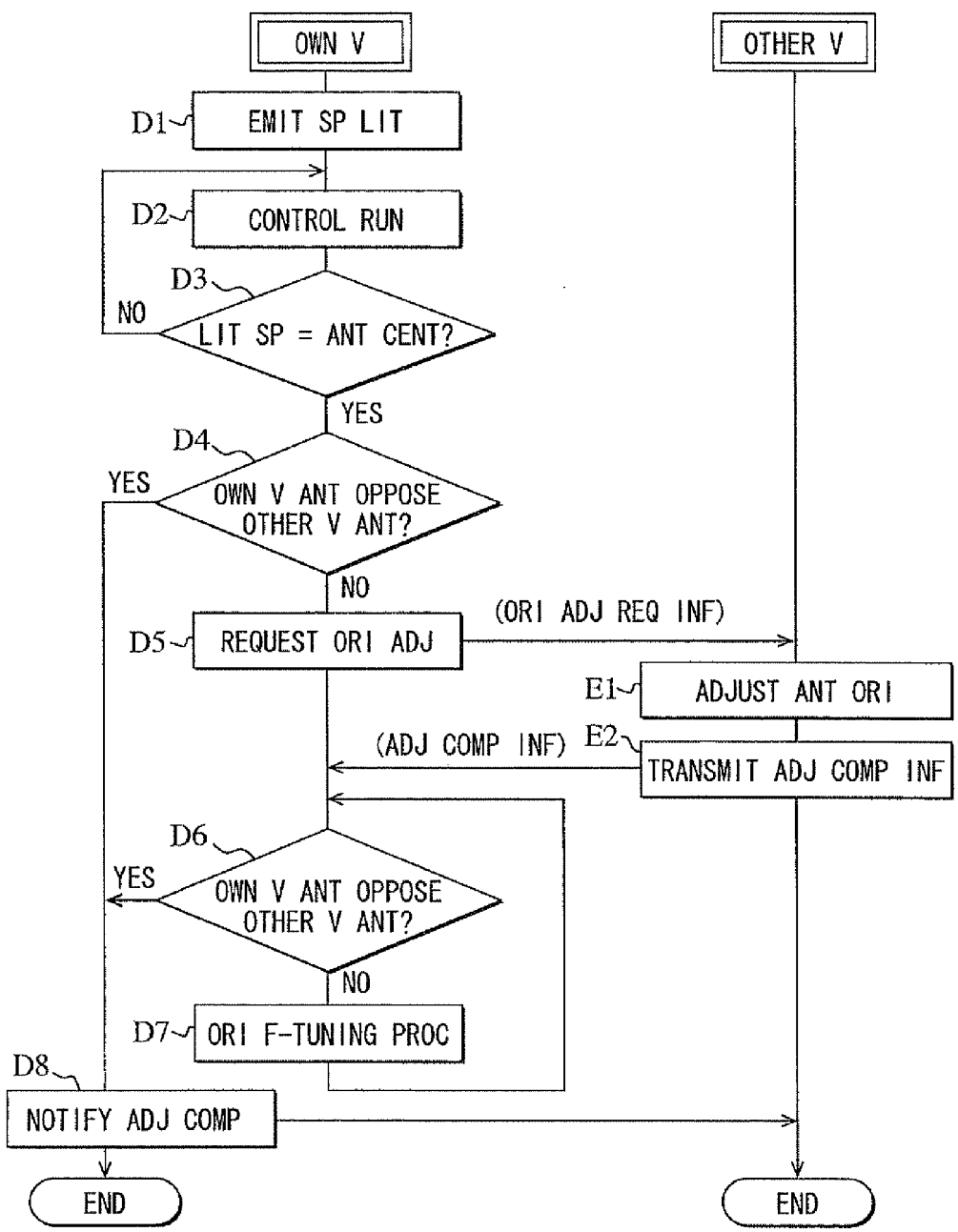
FIG. 14 is a flowchart showing an example of a content of antenna orientation adjustment processing.

The antenna orientation adjustment processing (processing made up of Step A3 and Step B4) will now be described with reference to FIG. 14.

More specifically, in the antenna orientation adjustment processing, the main controller 14a of the own vehicle 11a controls the light-emitting device 56a to emit a spot of light toward the other vehicle 11b (Step D1). Then, the main controller 14a automatically controls the running of the own vehicle 11a in such a manner that the spot of light emitted from the light-emitting device 56a falls on the center portion of the vehicle-vehicle power transmitting and receiving antenna 22b (in this case, the rear power transmitting and receiving antenna 22b2) provided to the other vehicle 11b (Step D2). Then, the main controller 14a determines whether the spot of light emitted from the light-emitting device 56a fell on the center portion of the vehicle-vehicle power transmitting and receiving antenna 22b (22b2) of the other vehicle 11b (Step D3). Determination as to whether a spot of light from the vehicle 11a fell on the center portion of the vehicle-vehicle power transmitting and receiving antenna 22b (22b2) can be made, for example, by analyzing an image captured by an unillustrated in-vehicle camera or using the configuration shown in FIG. 8 and FIG. 9 and described above (the configuration to detect a spot of light emitted from the other vehicle using light sensors or electrodes).

In a case where the main controller 14a fails to confirm that the spot of light emitted from the light-emitting device 56a fell on the center portion of the vehicle-vehicle power transmitting and receiving antenna 22b (22b2) of the other vehicle 11b (Step D3: NO), the flow returns to Step D2 described above, so that the main controller 14a again automatically controls the running of the own vehicle 11a. Meanwhile, upon confirming that the spot of light from the light-emitting device 56a fell on the center portion of the vehicle-vehicle power transmitting and receiving antenna 22b (22b2) of the other vehicle 11b (Step D3: YES), the main controller 14a compares the antenna orientation information of the vehicle-vehicle power transmitting and receiving antenna 22a of the own vehicle 11a and the received antenna orientation information of the other vehicle 11b while continuing to control the running of the own vehicle 11a (automatic control) so as to maintain (lock) the confirmed state. In this case, it may be configured in such a manner that the main controller 14a of the own vehicle 11a controls the running of the other vehicle 11b as well by transmitting a running control signal to the other vehicle 11b.

Subsequently, the main controller 14a determines whether the vehicle-vehicle power transmitting and receiving antenna 22a (in this case, the front power transmitting and receiving antenna 22a1) of the own vehicle 11a and the vehicle-vehicle power transmitting and receiving antenna 22b (in this case, the rear power transmitting and receiving antenna 22b2) of the other vehicle 11b are mutually opposing, that is, whether the orientation of the vehicle-vehicle power transmitting and receiving antenna 22a (22a1) and the orientation of the vehicle-vehicle power transmitting and receiving antenna 22b (22b2) are in agreement with each other, on the basis of the antenna orientation information (Step D4).

In a case where the vehicle-vehicle power transmitting and receiving antenna 22a (22a1) of the own vehicle 11a and the vehicle-vehicle power transmitting and receiving antenna 22b (22b2) of the other vehicle 11b are mutually opposing (Step D4: YES), the main controller 14a transmits an adjustment completion notice indicating that an antenna orientation adjustment is completed to the vehicle 11b (Step D8) and ends the antenna orientation adjustment processing.

On the contrary, in a case where the vehicle-vehicle power transmitting and receiving antenna 22a (22a1) of the own vehicle 11a and the vehicle-vehicle power transmitting and receiving antenna 22b (22b2) of the other vehicle 11b are not mutually opposing (Step D4: NO), the main controller 14a computes an amount of adjustment of orientation (an amount of adjustment in a vertical direction and an amount of adjustment in a horizontal direction) of the vehicle-vehicle power transmitting and receiving antenna 22b (22b2) necessary for the vehicle-vehicle power transmitting and receiving antenna 22a (22a1) and the vehicle-vehicle power transmitting and receiving antenna 22b (22b2) to mutually oppose, and transmits orientation adjustment request information containing the amount of adjustment thus computed to the other vehicle 11b (Step D5).

Upon receipt of the orientation adjustment request information from the own vehicle 11a at the end of the other vehicle 11b, the main controller 14b adjusts an orientation of the vehicle-vehicle power transmitting and receiving antenna 22b (22b2) according to the amount of adjustment contained in the orientation adjustment request information (Step E1). Having completed the orientation adjustment of the vehicle-vehicle power transmitting and receiving antenna 22b (22b2) according to the received amount of adjustment, the main controller 14b transmits adjustment completion information indicating a completion of the adjustment to the own vehicle 11a. The adjustment completion information contains after-adjustment orientation information specifying an orientation of the vehicle-vehicle power transmitting and receiving antenna 22b (22b2) after adjustment. The main controller 14b ends the antenna orientation adjustment processing upon receipt of the adjustment completion notice (see Step D8) from the vehicle 11a.

Upon receipt of the adjustment completion information from the other vehicle 11b at the end of the own vehicle 11a, the main controller 14a determines again whether the vehicle-vehicle power transmitting and receiving antenna 22a (22a1) of the own vehicle 11a and the vehicle-vehicle power transmitting and receiving antenna 22b (22b2) of the other vehicle 11b are mutually opposing (Step D6). Then, in a case where the vehicle-vehicle power transmitting and receiving antenna 22a (22a1) of the own vehicle 11a and the vehicle-vehicle power transmitting and receiving antenna 22b (22b2) of the other vehicle 11b are mutually opposing (Step D6: YES), the main controller 14a transmits an adjustment completion notice to the vehicle 11b (Step D8) and ends the antenna orientation adjustment processing.

On the contrary, in a case where the vehicle-vehicle power transmitting and receiving antenna 22a (22a1) of the own vehicle 11a and the vehicle-vehicle power transmitting and receiving antenna 22b (22b2) of the other vehicle 11b are not mutually opposing (Step D6: NO), the main controller 14a performs orientation fine-tuning processing (Step D7).

In the orientation fine-tuning processing, the main controller 14a adjusts an orientation of the vehicle-vehicle power transmitting and receiving antenna 22a (22a1) of the own vehicle 11a so that an orientation of the vehicle-vehicle power transmitting and receiving antenna 22b (22b2) of the other vehicle 11b and an orientation of the power transmitting and receiving antenna 22a (22a1) of the own vehicle 11a after adjustment specified by after-adjustment orientation information mutually oppose. It may be configured in such a manner that, in the orientation fine-tuning processing, the main controller 14a again computes an amount of orientation adjustment and transmits the orientation adjustment request information to the other vehicle 11b to adjust the orientation of the vehicle-vehicle power transmitting and receiving antenna 22b (22b2) of the other vehicle 11b. Alternatively, it may be configured in such a manner that the main controller 14a adjusts both of an orientation of the vehicle-vehicle power transmitting and receiving antenna 22a (22a1) of the own vehicle 11a and an orientation of the vehicle-vehicle power transmitting and receiving antenna 22b (22b2) of the other vehicle 11b.

The main controller 14a again determines whether the vehicle-vehicle power transmitting and receiving antenna 22a (22a1) of the own vehicle 11a and the vehicle-vehicle power transmitting and receiving antenna 22b (22b2) of the other vehicle 11b are mutually opposing (Step D6). In a case where the vehicle-vehicle power transmitting and receiving antenna 22a (22a1) of the own vehicle 11a and the vehicle-vehicle power transmitting and receiving antenna 22b (22b2) of the other vehicle 11b are still not mutually opposing (Step D6: NO), the main controller 14a repeats the orientation fine-tuning processing (Step D7).

When the vehicle-vehicle power transmitting and receiving antenna 22a (22a1) of the own vehicle 11a and the vehicle-vehicle power transmitting and receiving antenna 22b (22b2) of the other vehicle 11b mutually oppose finally (Step D6: YES), the main controller 14a transmits an adjustment completion notice to the vehicle 11b (Step D8) and ends the antenna orientation adjustment processing.

Figure 13:
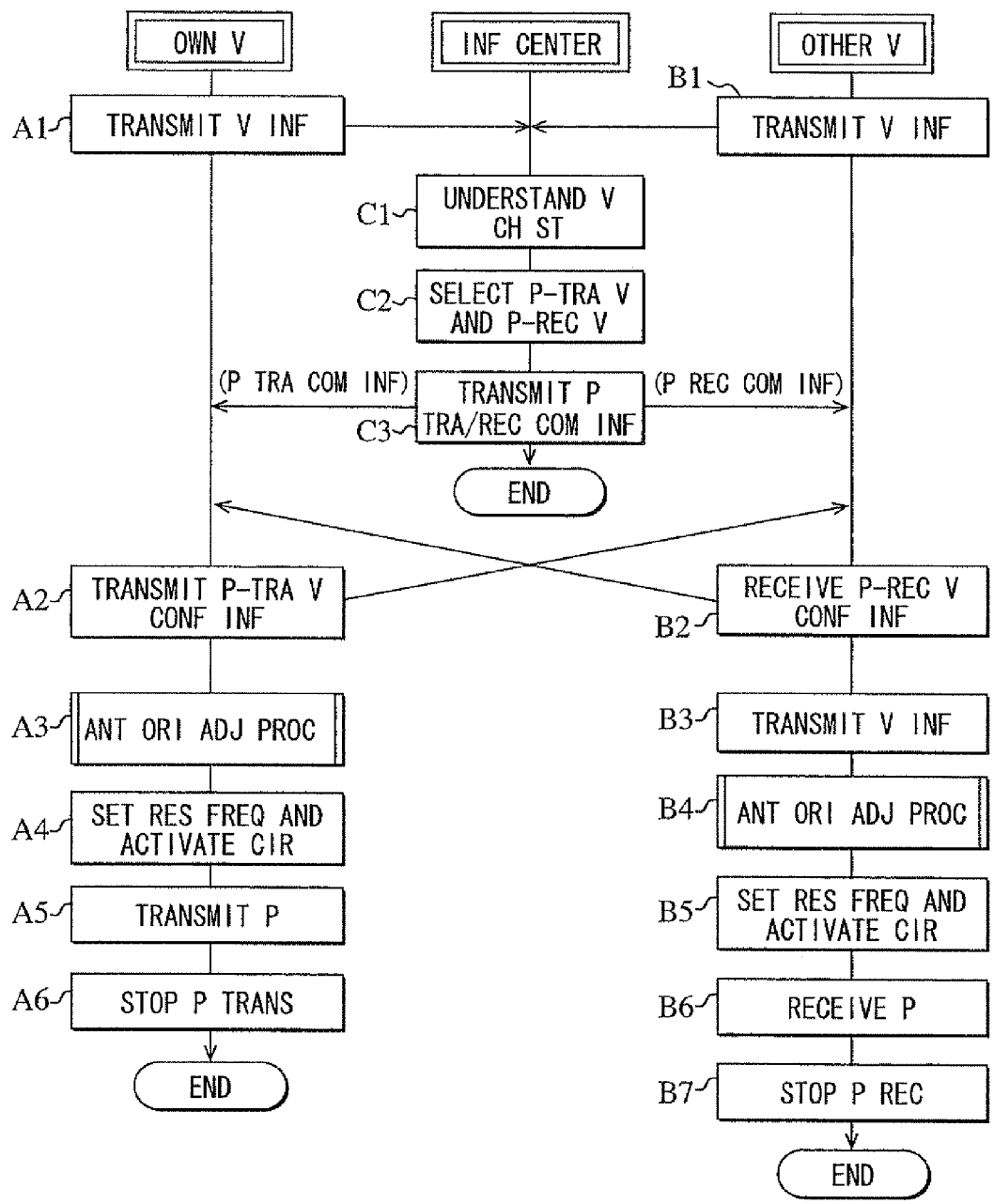
FIG. 13 is a flowchart showing an example of an operation content of the power transmitting and receiving system for vehicle.

When the main controller 14a of the power-transmitter vehicle (own vehicle 11a) and the main controller 14b of the power-receiver vehicle (other vehicle 11b) end the antenna orientation adjustment processing (Step A3 and Step B4, respectively), as is shown in FIG. 13, the main controllers 14a and 14b set a resonant frequency suitable to power transmission and reception to be performed between the own vehicle 11a and the other vehicle 11b and start respective circuits (the power transmission and reception processing circuit, the power conversion processing circuit, the state-of-charge monitoring circuit, and the like) (Step A4 and Step B5, respectively). Then, the main controllers 14a and 14b complete the power transmission preparation processing and the power reception preparation processing.

Subsequently, having completed the power transmission preparation processing, the main controller 14a of the power-transmitter vehicle wireless transmits power stored (charged) in the in-vehicle battery 41a incorporated in the own vehicle 11a from the vehicle-vehicle power transmitting and receiving antenna 22a (in this case, the front power transmitting and receiving antenna 22a1) to the other vehicle 11b (Step A5). Meanwhile, having completed the power reception preparation processing, the main controller 14b of the power-receiver vehicle receives power transmitted from the own vehicle 11a by the vehicle-vehicle power transmitting and receiving antenna 22b (in this case, the rear power transmitting and receiving antenna 22b2) and stores (charges) the received power in the in-vehicle battery 41b (Step B6). While power is transmitted and received wirelessly between the own vehicle 11a and the other vehicle 11b at the vehicle-vehicle power transmitting and receiving antennas 22a and 22b in this manner, the main controllers 14a and 14b of the power transmitting and receiving devices 12a and 12b, respectively, automatically control the running of the own vehicle 11a and the running of the other vehicle 11b, respectively. Alternatively, it may be configured in such a manner that the main controller in one power transmitting and receiving device automatically controls running of the both vehicles by allowing the main controller in one power transmitting and receiving device to transmit a running control signal to the main controller in the other power transmitting and receiving device.

The main controller 14a of the own vehicle 11a stops transmission of power when an amount of power transmitted from the own vehicle 11a reaches a predetermined target value or a power transmission time reaches a predetermined reference time (Step A6). Also, the main controller 14b of the other vehicle 11b stops reception of power when an amount of power transmitted from the own vehicle 11a reaches a predetermined target value or a power reception time reaches a predetermined reference time (Step B7).

Herein, timing at which transmission of power is stopped may not coincide with timing at which reception of power is stopped. For such a case, it is recommendable to configure in such a manner that the other vehicle 11b stops reception of power when transmission of power from the own vehicle 11a has stopped whereas the own vehicle 11a stops transmission of power when reception of power by the other vehicle 11b has stopped. Also, it is recommendable to configure in such a manner that the main controller 14b of the other vehicle 11b as the power-receiver vehicle notifies the own vehicle 11a as the power-transmitter vehicle of a power reception state (a state of charge of the in-vehicle battery 41b) while the other vehicle 11b is receiving power from the own vehicle 11a as the power-transmitter vehicle.

Owing to this configuration, the main controller 14a of the own vehicle 11a as the power-transmitter vehicle becomes able to understand a state of charge of the in-vehicle battery 41b of the other vehicle 11b as the power-receiver vehicle and consequently becomes able to stop transmission of power at right timing when a just enough amount of power is transmitted without transmitting power excessively to the other vehicle 11b or transmitting power insufficiently to the other vehicle 11b.

It should be noted that it is also possible to adjust an orientation of the vehicle-vehicle power transmitting and receiving antenna 22a (22b) during transmission and reception of power (while Step A5 and Step B6 are performed). More specifically, it may be configured as follows. That is, the main controller 14a of the power-transmitter vehicle calculates power transmitting and receiving efficiency by comparing power actually transmitted to the power-receiver vehicle with power actually stored in the in-vehicle battery 41b of the power-receiver vehicle by this power transmission. In a case where the calculated transmitting and receiving efficiency is lower than a predetermined reference value, an orientation of the vehicle-vehicle power transmitting and receiving antenna 22a of the own vehicle 11a is adjusted and/or an orientation of the vehicle-vehicle power transmitting and receiving antenna 22b of the other vehicle 11b is adjusted (orientation adjustment request is issued).

Alternatively, it may be configured as follows. That is, the main controller 14a of the own vehicle 11a as the power-transmitter vehicle notifies the power-receiver vehicle of transmitted power information specifying actually transmitted power. Meanwhile, the main controller 14b of the other vehicle 11b as the power-receiver vehicle calculates power transmitting and receiving efficiency by comparing the power that the power-transmitter vehicle actually transmitted (power specified by the transmitted power information) with power actually stored in the in-vehicle battery 41b of the power-receiver vehicle. In a case where the calculated transmitting and receiving efficiency is lower than a predetermined reference value, an orientation of the vehicle-vehicle power transmitting and receiving antenna 22b of the other vehicle 11b is adjusted and/or an orientation of the vehicle-vehicle power transmitting and receiving antenna 22a of the own vehicle 11a is adjusted (orientation adjustment request is issued).

Further, it may be configured in such a manner that the power-transmitter vehicle notifies the power-receiver vehicle of charges for power transmitted to the power-receiver vehicle.

FIGS. 15A through 15D visually show operation contents in adjustment processing and fine-tuning processing of an orientation of the power transmitting and receiving antenna described above.

Figure 15A:
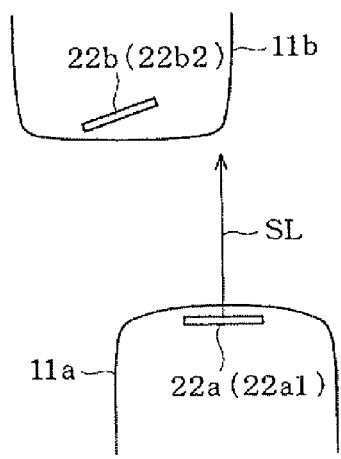
FIGS. 15A through 15D are diagrams visually showing the operation content.
Figure 15B:
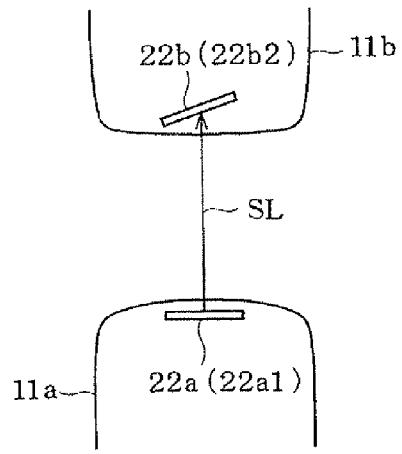
Figure 15C:
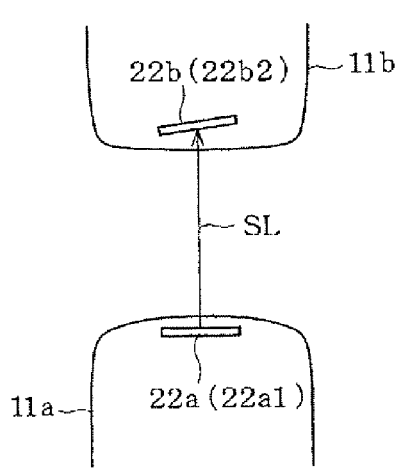

More specifically, as is shown in FIG. 15A, the own vehicle 11a as the power-transmitter vehicle (the main controller 14a of the power transmitting and receiving device 12a) controls the light-emitting device 56a to emit a spot of light, SL, toward the other vehicle 11b as the power-receiver vehicle in front of the own vehicle 11a. Subsequently, as is shown in FIG. 15B, running of the own vehicle 11a (and/or the other vehicle 11b) is controlled so that the spot of light, SL, emitted from the light-emitting device 56a falls on the center portion of the vehicle-vehicle power transmitting and receiving antenna 22b (22b2) of the other vehicle 11b. Eventually, the spot of light, SL, from the light-emitting device 56a falls on the center portion of the vehicle-vehicle power transmitting and receiving antenna 22b (22b2) of the other vehicle 11b. Then, while this state is maintained, a determination is made as to whether the vehicle-vehicle power transmitting and receiving antenna 22a (22a1) of the own vehicle 11a and the vehicle-vehicle power transmitting and receiving 22b (22b2) of the other vehicle 11b are mutually opposing. In a case where the vehicle-vehicle power transmitting and receiving antenna 22a (22a1) and the vehicle-vehicle power transmitting and receiving antenna 22b (22b2) are not mutually opposing, an antenna orientation adjustment request is issued (orientation adjustment request information is transmitted) from the own vehicle 11a to the other vehicle 11b. In response to this adjustment request, as is shown in FIG. 15C, an orientation of the vehicle-vehicle power transmitting and receiving antenna 22b (22b2) is adjusted at the end of the other vehicle 11b.

Figure 15D:
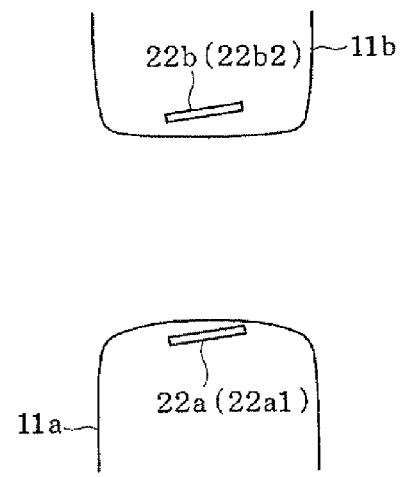

In a case where the vehicle-vehicle power transmitting and receiving antenna 22a (22a1) and the vehicle-vehicle power transmitting and receiving antenna 22b (22b2) are still not mutually opposing after the adjustment, as is shown in FIG. 15D, an orientation of the vehicle-vehicle power transmitting and receiving antenna 22a (22a1) of the own vehicle 11a is adjusted additionally. Fine-tuning of an antenna orientation is thus made. As has been described, it may be configured in such a manner that fine-tuning is made by adjusting an orientation of the vehicle-vehicle power transmitting and receiving antenna 22b (22b2) of the other vehicle 11b. Alternatively, both of an orientation of the vehicle-vehicle power transmitting and receiving antenna 22a (22a1) of the own vehicle 11a and an orientation of the vehicle-vehicle power transmitting and receiving antenna 22b (22b2) of the other vehicle 11b may be fine-tuned.

Through the adjustment operation as above, it becomes possible to achieve a state in which the vehicle-vehicle power transmitting and receiving antenna 22a of the own vehicle 11a and the vehicle-vehicle power transmitting and receiving antenna 22b of the other vehicle 11b are mutually opposing.

The above has described the configuration and the operation content in a case where wireless vehicle-vehicle power transmission and reception is performed. An energy balance (a manner in which power is stored and consumed) in association with running of a vehicle will now be described with reference to FIGS. 16A through 16C. FIG. 16A shows an example of an up-down state of a route in which a vehicle runs. FIG. 16B shows an example of a manner in which an energy balance of the vehicle changes when the vehicle runs in the route specified above. FIG. 16C shows an example of a manner in which an energy balance changes when the vehicle running in this route performs transmission and reception of power. In FIGS. 16B and 16C, a region below a reference line K shows that power is consumed (discharged) with the running of the vehicle and a region above the reference line K shows that power is stored (generated) with the running of the vehicle. The power transmitting and receiving device 12a (12b) is configured to create data indicating a manner in which an energy balance changes with the running of the vehicle or acquire such data from an outside source (for example, the information center 13) to store the data therein.

Firstly, the vehicle runs in a section A (a section from a point 0 to a point 1; in this case, the point 0 is given as a start point). Because the section A is a gentle uphill continuing from the point 0 to the point 1, as is shown in FIG. 16B, power (energy) stored in the in-vehicle battery is consumed moderately (see a diagonally hatched region corresponding to the section A).

Subsequently, the vehicle runs into a section B (a section from the point 1 to a point 2). Because the section B is a slightly steep uphill continuing from the point 1 to the point 2 (for example, an ascending road to a hill inclined gentler than that to a mountain), as is shown in FIG. 16B, power stored in the in-vehicle battery is consumed rather rapidly (at least more rapidly than in the section A and more moderately than in a section F described below) (see a diagonally hatched region corresponding to the section B).

Subsequently, the vehicle runs into a section C (a section from the point 2 to a point 3). Because the section C is a rather steep downhill continuing from the point 2 to the point 3 (for example, a descending road from a hill inclined gentler than that from a mountain), as is shown in FIG. 16B, power (energy equivalent to potential energy stored in the vehicle all the way up to the point 2 and regenerative energy generated in braking of the vehicle) is stored in the in-vehicle battery rather rapidly (power is stored more moderately than at least in a section G described below) (see a diagonally hatched region corresponding to the section C).

Subsequently, the vehicle runs into a section D (a section from the point 3 to a point 4; in this case, assume that the point 3 is a baggage loading point). Because the section D is a gentle uphill continuing from the point 3 to the point 4, as is shown in FIG. 16B, power (energy) stored in the in-vehicle battery is consumed moderately (see a diagonally hatched region corresponding to the section D). Herein, because a total weight of the vehicle increases at the point 3 (an increase comparable to a weight of the loaded baggage), power (energy) stored in the in-vehicle battery is consumed more in the section D for an increase of the total weight of the vehicle.

Subsequently, the vehicle runs into a section E (a section from the point 4 to a point 5; in this case, assume that a traffic jam is occurring in the section E). Because the section E is a substantially flat section continuing from the point 4 to the point 5, as is shown in FIG. 16B, power (energy) stored in the in-vehicle battery is little consumed (for example, as little power as energy equivalent to frictional energy occurring with the running is consumed). In this case, however, a traffic jam is occurring in the section E. Hence, because the vehicle is repetitively stopped and accelerated at short intervals, power (energy) is consumed gradually with such repetitive operations (see a diagonally hatched region corresponding to the section E).

Subsequently, the vehicle runs into a section F (a section from the point to a point 6). Because the section F is a steep uphill continuing from the point 5 to the point 6 (for example, an ascending road to a mountain inclined steeper than that to a hill), as is shown in FIG. 16B, power (energy) stored in the in-vehicle battery is consumed rapidly (at least more rapidly than in the section B described above) (see a diagonally hatched region corresponding to the section F).

Subsequently, the vehicle runs into a section G (a section from the point 6 to a point 7). Because the section G is a steep downhill continuing from the point 6 to the point 7 (for example, a descending road from a mountain inclined steeper than that from a hill), as is shown in FIG. 16B, power (energy equivalent to potential energy stored in the vehicle all the way up to the point 6 and regenerative energy generated in braking of the vehicle) is stored rapidly (more rapidly than at least in the section C described above) (see a diagonally hatched region corresponding to the section G).

Subsequently, the vehicle runs into a section H (a section from the point 7 to a point 8). Because the section H is a gentle uphill continuing from the point 7 to the point 8, as is shown in FIG. 16B, power (energy) stored in the vehicle-battery is consumed moderately (see a diagonally hatched portion corresponding to the section H).

Subsequently, the vehicle runs into a section I (a section from the point 8 to a point 9; the point 8 is a baggage unloading point and the point 9 is a destination). Because the section I is a gentle downhill continuing from the point 8 to the point 9, as is shown in FIG. 16B, power (energy equivalent to potential energy stored in the vehicle all the way up to the point 8 and regenerative energy generated in braking of the vehicle) is stored moderately into the in-vehicle battery (see a diagonally hatched region correspond to the section I). Herein, because a total weight of the vehicle decreases at the point 8 (a decrease comparable to a weight of unloaded baggage), power is stored in the in-vehicle battery more in the section I for a decrease of the total weight of the vehicle.

By summing up amount of consumption and an amount of storage corresponding to the respective sections A through I shown in FIG. 16B (the diagonally hatched regions of FIG. 16B), it becomes possible to understand a manner in which an energy balance changes (see a solid line E1 of FIG. 16B) while the vehicle runs from the point 0 (start point) to the point 9 (destination).

According to a chart of energy balance as is shown in FIG. 16B, it becomes possible to understand at which point and in which section power (energy) is consumed considerably and at which point and in which section power (energy) is stored (generated) considerably with the running of the vehicle. It should be appreciated that a manner in which an energy balance changes with running of the vehicle varies with road surface conditions (whether the road surface is dry or wet, whether the road surface is smooth or rough), weather conditions (conditions as to an amount of rain and whether rain is heavy or light, a direction of wind and whether wind is strong or weak), running times (whether it is a daytime or nighttime), and the like.

More specifically, for example, in a case where a moving direction of the vehicle is against the wind, consumption of power (energy) increases. Conversely, in a case where the wind is blowing in the same direction as a moving direction of the vehicle, consumption of power (energy) decreases. Consumption of power (energy) increases when it rains due to an operation of windshield wipers, an operation of a defogging device, and deterioration of braking efficiency and acceleration efficiency of the vehicle. Also, consumption of power (energy) increases when the running time is a nighttime due to an operation of a lighting device, such as head lights. In this manner, a manner in which an energy balance changes with running of the vehicle varies with various environmental conditions. It is therefore desirable to make a correction in response to various environmental conditions.

The above has described an example of an energy balance in a case where wireless power transmission and reception is not performed at all while the vehicle runs from the point 0 (start point) to the point 9 (destination). A description will now be given to an example of an energy balance in a case where wireless power transmission and reception is performed while the vehicle runs from the point 0 (start point) to the point 9 (destination).

More specifically, in a case where wireless power transmission and reception is not performed at all while the vehicle runs from the point 0 (start point) to the point 9 (destination) as described above, a state of charge (amount of charge) of the in-vehicle battery may possibly fall below a least allowable voltage value at the points 2 and 6. A load is therefore applied to the in-vehicle battery, which gives rise to deterioration of the in-vehicle battery.

To eliminate this inconvenience, as is shown in FIG. 16C, wireless vehicle-vehicle power transmission and reception is performed when the vehicle moves onto the section B from the section A (section A/B), so that the in-vehicle battery is charged with power obtained from the other vehicle. Owing to this configuration, it becomes possible to avoid an inconvenience that a state of charge of the in-vehicle battery falls below the least allowable voltage value at the point 2.

Also, wireless vehicle-vehicle power transmission and reception is performed when the vehicle moves onto the section F from the section E (section E/F), so that the in-vehicle battery is charged with power obtained from the other vehicle. Owing to this configuration, it becomes possible to avoid an inconvenience that a state of charge of the in-vehicle battery falls below the least allowable voltage value at the point 6. In this case, sufficient power above the least allowable voltage value is stored in the in-vehicle battery and the in-vehicle battery therefore has stored enough power to spare. In the section G where the vehicle runs into subsequently, power can be stored rapidly into the in-vehicle battery. Hence, when the vehicle moves onto the section G from the section F (section F/G), wireless power transmission and reception is performed between the vehicle and the infrastructure equipment, so that power in the own vehicle can be transmitted (discharged) to the outside infrastructure equipment.

As has been described, FIG. 16C shows, by a solid line E2, a manner in which an energy balance changes in a case where wireless power transmission and reception is performed while the vehicle runs from the point 0 (start point) to the point 9 (destination).

As has been described, according to this embodiment, in the power transmitting and receiving system 10 for vehicle, the power transmitting and receiving device 12a (12b) includes the vehicle-vehicle power transmitting and receiving antenna 22a (22b) formed in such a manner that an orientation thereof is changeable and configured to enable wireless transmission of power that the own vehicle 11a (11b) holds to the other vehicle 11b (11a) and/or wireless reception of power that the other vehicle 11b (11a) holds by the own vehicle 11a (11b).

The main controller 14a (14b) of the power transmitting and receiving device 12a (12b) communicates with the other vehicle 11b by means of the information communication processing portion 33a (33b) by transmitting the longitudinal inter-vehicle distance specifying information specifying a distance between the own vehicle 11a and the other vehicle 11b and the horizontal displacement amount specifying information specifying an amount of horizontal displacement between the own vehicle 11a and the other vehicle 11b as the vehicle positional relation specifying information. The main controller 14a (14b) transmits the own vehicle antenna orientation specifying information specifying an orientation of the vehicle-vehicle power transmitting and receiving antenna 22a (22b) provided to the own vehicle 11a (11b) to the other vehicle 11b (11a) and receives the other vehicle antenna orientation specifying information specifying an orientation of the vehicle-vehicle power transmitting and receiving antenna 22b (22a) provided to the other vehicle 11b (11a) by means of the orientation specifying information transmission and reception processing portion 34a (34b). Also, on the basis of the vehicle positional relation specifying information, the own vehicle antenna orientation specifying information, and the other vehicle antenna orientation specifying information, the main controller 14a (14b) changes an orientation of the vehicle-vehicle power transmitting and receiving antenna 22a (22b) provided to the own vehicle 11a (11b) and/or an orientation of the vehicle-vehicle power transmitting and receiving antenna 22b (22a) provided to the other vehicle 11b (11a) by means of the antenna orientation change processing portion 35a (35b), so that the vehicle-vehicle power transmitting and receiving antenna 22a (22b) provided to the own vehicle 11a (11b) and the vehicle-vehicle power transmitting and receiving antenna 22b (22a) provided to the other vehicle 11b (11a) mutually oppose.

Owing to this configuration, in a case where wireless vehicle-vehicle power transmission and reception is performed, the vehicle-vehicle power transmitting and receiving antennas 22a and 22b of the vehicles 11a and 11b, respectively, mutually oppose according to a positional relation of the respective vehicles 11a and 11b and orientations of the power transmitting and receiving antennas 22a and 22b of the vehicles 11a and 11b, respectively. It thus becomes possible to perform wireless power transmission and reception between vehicles efficiently.

Also, wireless power transmission and reception by the vehicle-vehicle power transmitting and receiving antennas 22a and 22b is performed by resonance induction instead of electromagnetic induction that limits a power transceivable distance rather short. Accordingly, it becomes possible to perform wireless power transmission and reception in a reliable manner even when there is a relatively long distance (a distance too far to perform power transmission and reception by electromagnetic induction) between vehicles that are to perform power transmission and reception.

Also, the horizontal displacement amount specifying information used to adjust orientations of the vehicle-vehicle power transmitting and receiving antennas 22a and 22b is identified as information containing distances between center positions of the vehicles 11a and 11b in a horizontal direction and positions at which the vehicle-vehicle power transmitting and receiving antennas 22a and 22b are installed to the vehicles 11a and 11b, respectively. Owing to this configuration, even in a case where the vehicle-vehicle power transmitting and receiving antennas 22a and 22b are installed at positions displaced, respectively, from the center positions of the vehicles 11a and 11b in a horizontal direction, it becomes possible to adjust orientations of the power transmitting and receiving antennas 22a and 22b by taking an amount of this displacement into account.

Also, after the power transmitting and receiving device 12a (12b) makes a spot of light emitted from the light-emitting device 56a (56b) provided to the own vehicle 11a (11b) fall on the center portion of the vehicle-vehicle power transmitting and receiving antenna 22b (22a) provided to the other vehicle 11b (11a) or makes a spot of light emitted from the light-emitting device 56b (56a) provided to the other vehicle 11b (11a) fall on the center portion of the vehicle-vehicle power transmitting and receiving antenna 22a (22b) provided to the own vehicle 11a (11b), the power transmitting and receiving device 12a (12b) changes an orientation of the vehicle-vehicle power transmitting and receiving antenna 22a (22b) provided to the own vehicle 11a (11b) and/or an orientation of the vehicle-vehicle power transmitting and receiving antenna 22b (22a) provided to the other vehicle 11b. By utilizing a spot of light in this manner, it becomes possible to adjust orientations of the vehicle-vehicle power transmitting and receiving antennas 22a and 22b at a higher degree of accuracy.

Also, the information center 13 selects a vehicle that transmits power and/or a vehicle that receives power from the respective vehicles 11a and 11b by means of the selection processing portion 95. Owing to this configuration, a degree of freedom in selecting the power-transmitter vehicle and the power-receiver vehicle can be enhanced. It thus becomes possible to set the power-transmitter vehicle and the power-receiver vehicle appropriately.

Also, while wireless power transmission and reception is performed by the vehicle-vehicle power transmitting and receiving antennas 22a and 22b, the power transmitting and receiving devices 12a and 12b automatically controls running of the own vehicle 11a and running of the other vehicle 11b by means of the running control processing portion 36a (36b). Owing to this configuration, a positional relation of the vehicle-vehicle power transmitting and receiving antennas 22a and 22b having been adjusted so that orientations thereof mutually oppose is stabilized (a state in which the vehicle-vehicle power transmitting and receiving antennas 22a and 22b mutually oppose is maintained in a stable manner) while wireless vehicle-vehicle power transmission and reception is performed. It thus becomes possible to perform wireless power transmission and reception between vehicles more efficiently.

Second Embodiment

Figure 17:
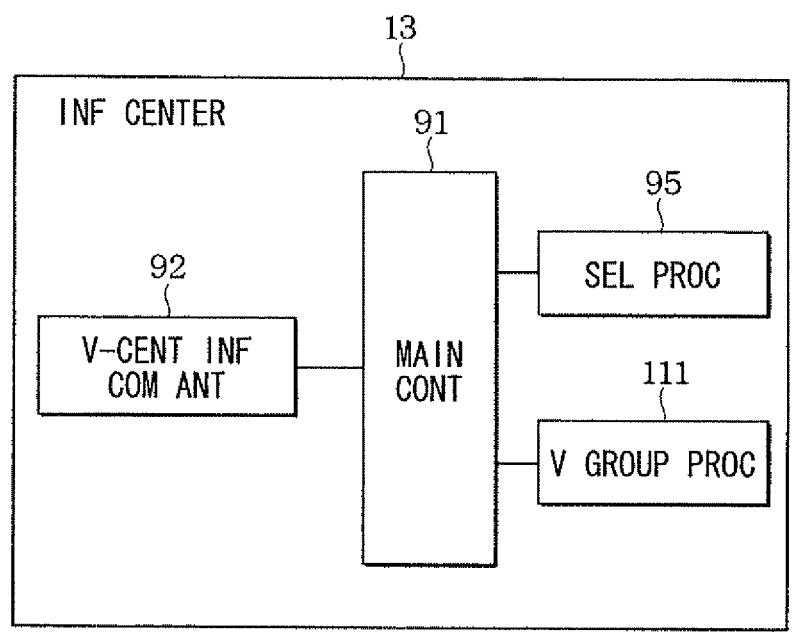
FIG. 17 is a diagram showing a configuration of an information center corresponding to FIG. 10 according to a second embodiment.
Figure 18:
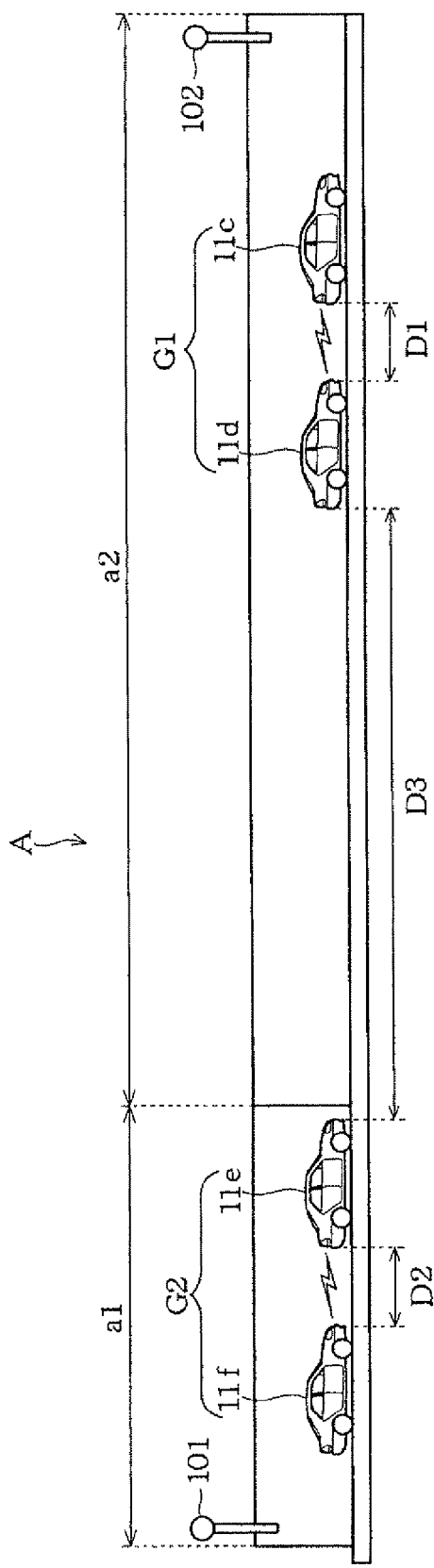
FIG. 18 is a diagram showing a configuration of a power transmitting and receiving area corresponding to FIG. 11.

A second embodiment will now be described with reference to FIG. 17 and FIG. 18. Hereinafter, a description is omitted for contents common with the first embodiment above and only contents different from the first embodiment above will be described.

That is, in this embodiment, the information center 13 further includes a vehicle grouping processing portion 111 as the main controller 91 runs a system control program. As is shown in FIG. 18, the vehicle grouping processing portion 111 is furnished with a function of sequentially dividing vehicles entering the power transmitting and receiving area A into groups each having several vehicles (for example, each groups has two vehicles). In this case, the vehicle grouping processing portion 111 groups a vehicle 11c entering the power transmitting and receiving area A earliest (first) and a vehicle 11d entering therein next (second) into a first group G1, and groups a vehicle 11e entering the power transmitting and receiving area A following the second vehicle 11d (third) and a vehicle 11f entering therein following the third vehicle 11e (fourth) into a second group G2.

Then, the main controller 91 of the information center 13 transmits inter-vehicle distance control information to the vehicles 11c and 11d belonging to the first group G1. This inter-vehicle distance control information is information to maintain an inter-vehicle distance D1 between the vehicles 11c and 11d at a predetermined distance. The inter-vehicle distance control information from the information center 13 is received at power transmitting and receiving control devices (not shown) of the respective vehicles 11c and 11d. Hence, while wireless power transmission and reception is performed between the vehicles 11c and 11d belonging to the first group G1 by the vehicle-vehicle power transmitting and receiving antennas within the power transmitting and receiving area A (running control zone a2), the power transmitting and receiving control devices control running of the corresponding vehicles 11c and 11d so as to maintain the inter-vehicle distance D1 between the vehicles 11c and 11d at a predetermined distance (an inter-vehicle distance specified by the inter-vehicle distance control information).

Meanwhile, the main controller 91 of the information center 13 transmits inter-vehicle distance control information to the vehicles 11e and 11f belonging to the second group G2. This inter-vehicle distance control information is information to maintain an inter-vehicle distance D2 between the vehicles 11e and 11f at a predetermined distance. The inter-vehicle distance control information from the information center 13 is received at power transmitting and receiving control devices (not shown) of the respective vehicles 11e and 11f. Hence, while wireless power transmission and reception is performed between the vehicles 11e and 11f belonging to the second group G2 by the vehicle-vehicle power transmitting and receiving antennas within the power transmitting and receiving area A (running control zone a2), the power transmitting and receiving control devices control running of the corresponding vehicles 11e and 11f to maintain the inter-vehicle distance D2 between the vehicles 11e and 11f at a predetermined distance (an inter-vehicle distance specified by the inter-vehicle distance control information).

Also, the main controller 91 of the information center 13 transmits inter-group distance control information to the vehicle 11d, which is one of the vehicles 11c and 11d belonging to the first group G1 that is running behind the other, and to the vehicle 11e, which is one of the vehicles 11e and 11f belonging to the second group G2 that is running in front of the other. The inter-group distance control information referred to herein is information to maintain an inter-group distance D3 (in this case, a distance between the first group G1 and the second group G2) at a predetermined distance. Upon receipt of the inter-group distance control information from the information center 13 at the respective vehicles 11*d* and 11*e*, running of the respective vehicles 11*d* and 11*e* is controlled so as to maintain the inter-group distance D3 at a predetermined distance (an inter-group distance specified by the inter-group distance control information) while wireless power transmission and reception is performed by the vehicle-vehicle power transmitting and receiving antennas within the power transmitting and receiving area A (running control zone a2).

According to this embodiment as described above, an inter-vehicle distance between vehicles belonging to each group and further a distance between the respective groups can be maintained adequately in a case where wireless vehicle-vehicle power transmission and reception is performed. It thus becomes possible to perform wireless vehicle-vehicle power transmission and reception safely.

Other Embodiments

The vehicle-vehicle power transmitting and receiving antenna 22*a* (22*b*), the vehicle-infrastructure power transmitting and receiving antenna 23*a* (23*b*), the vehicle-vehicle information communication antenna 24*a* (24*b*), the vehicle-center information communication antenna 25*a* (25*b*) can be formed integrally, for example, by sharing a single antenna or in the form of separate modules.

The embodiments above have described power transmission and reception between vehicles aligned in a longitudinal direction. It should be appreciated, however, that power transmission and reception between vehicles aligned side by side in a horizontal direction is also possible with the use of the left power transmitting and receiving antenna 22*a*3 (22*b*3) and the right power transmitting and receiving antenna 22*a*4 (22*b*4).

By adopting the following contents, the system can achieve further higher efficiency of wireless vehicle-vehicle power transmission and reception. Hereinafter, let a vehicle A be a vehicle running in front of the other vehicle in a moving direction of the respective vehicles, a vehicle B be a vehicle running behind the other vehicle, an antenna Aa be a vehicle-vehicle power transmitting and receiving antenna provided to the vehicle A, and an antenna Ba be a vehicle-vehicle power transmitting and receiving antenna provided to the vehicle B.

Figure 19:
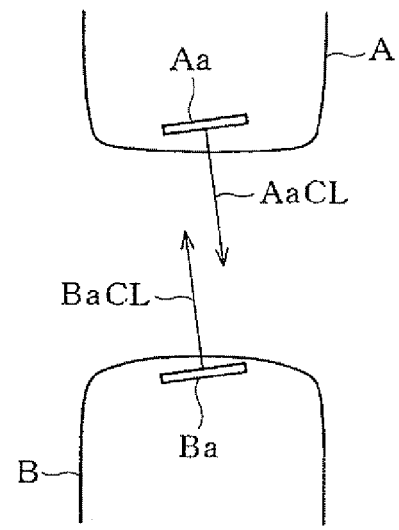
FIG. 19 is a diagram visually showing the operation content corresponding to FIG. 15D according to a modification.

More specifically, FIG. 19 shows a state shown in FIG. 151D. In this state, although the antenna Aa of the vehicle A and the antenna Ba of the vehicle B are parallel to each other, a center axis AaCL of the antenna Aa (a center line extending in a normal to the antenna Aa), and a center axis Baa of the antenna Ba (a center line extending in a normal to the antenna Ba) are displaced (a state where the both center axes are not mutually opposing). To correct this displacement, the power transmitting and receiving devices of the respective vehicles A and B are configured in such a manner that the both can control running of the corresponding vehicles A and B to bring the center axis AaCL of the antenna Aa and the center axis BaCL of the antenna Ba in agreement with each other (for the both center axes to mutually oppose).

Figure 20A:
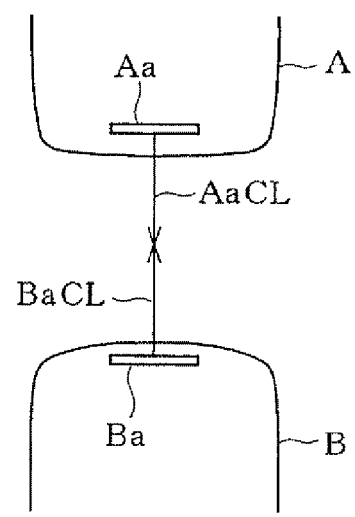
FIGS. 20A and 20B are diagrams describing different running patterns (Part 1)
Figure 20B:
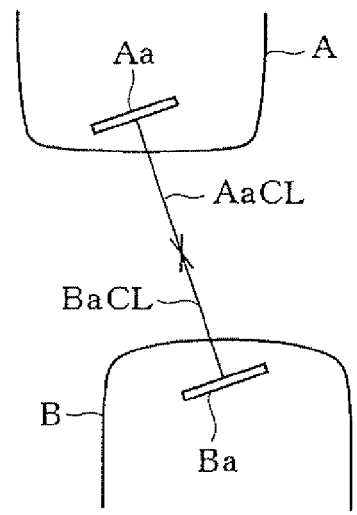

More specifically, the power transmitting and receiving devices of the respective vehicles A and B are configured in such a manner that each can perform a running pattern shown in FIG. 20A and a running pattern shown in FIG. 20B. The running pattern shown in FIG. 20A is a pattern by which running of the respective vehicles A and B is controlled in such a manner that the antennas Aa and Ba of the vehicles A and B, respectively, mutually oppose in parallel at right angles (substantially 90 degrees) to a vehicle moving direction (upward in the drawing) while the center axes AaCL and BaCL of the antennas Aa and Ba, respectively, mutually oppose. On the other hand, the running pattern shown in FIG. 20B is a pattern by which running of the respective vehicles A and B is controlled in such a manner that the antennas Aa and Ba of the vehicles A and B, respectively, mutually oppose in parallel at an angle other than right angles (other than substantially 90 degrees) to a vehicle moving direction while the center axes AaCL and BaCL of the antennas Aa and Ba, respectively, mutually oppose.

Figure 21:
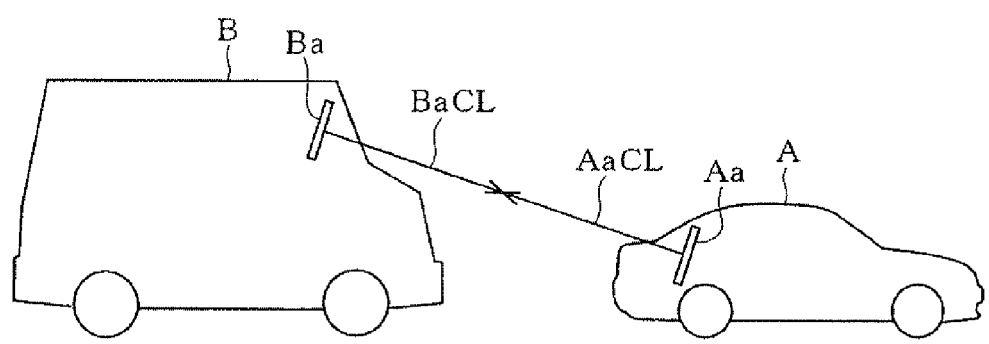
FIG. 21 is a diagram used to deCorrected, DD.scribe a level of need for vertical angle adjustment and control on antennas.

In the running pattern shown in FIG. 20A, in a case where an inter-vehicle distance between the vehicles A and B (a distance along a moving direction) varies, it becomes necessary to adjust and control angles of the respective antennas Aa and Ba in a vertical direction. On the other hand, because the respective antennas Aa and Ba are at right angles to a moving direction of the vehicles A and B, there is no need to adjust and control an angle in a horizontal direction. In this case, for example, as is shown in FIG. 21, a need to adjust and control angles of the respective antennas Aa and Ba in a vertical direction increases with a difference in height between the installment positions of the antennas Aa and Ba in the vehicles A and B, respectively. In short, in the running pattern shown in FIG. 20A, angle control of the respective antennas Aa and Ba in a case where an inter-vehicle distance varies is chiefly uniaxial rotation control in a vertical direction. Herein, upward angles of the respective antennas Aa and Ba are elevation angles and downward angles are inclination angles.

Meanwhile, in the running pattern shown in FIG. 20B, in a case where an inter-vehicle distance between the vehicles A and B varies, as with the running pattern shown in FIG. 20A, it becomes necessary to adjust and control angles of the respective antennas Aa and Ba in a vertical direction. Also, because the respective antennas Aa and Ba are not at right angles to a moving direction of the vehicles A and B, it also becomes necessary to adjust and control angles in a horizontal direction. In short, in the running pattern shown in FIG. 20B, the angle control of the respective antennas Aa and Ba in a case where an inter-vehicle distance varies is biaxial rotation control in a vertical direction and a horizontal direction. Hence, in comparison with the running pattern shown in FIG. 20A, angle control of the antennas Aa and Ba when an inter-vehicle distance varies becomes complex.

In view of the foregoing, the power transmitting and receiving devices of the respective vehicles adopt the running pattern shown in FIG. 20A preferentially to the running pattern shown in FIG. 20B. More specifically, the respective power transmitting and receiving devices preferentially perform the running pattern shown in FIG. 20A in a case where the respective power transmitting and receiving devices are able to perform the running pattern shown in FIG. 20A, that is, in a case where the respective power transmitting and receiving devices are able to control running of the corresponding vehicles A and B in such a manner that the antennas Aa and Ba of the vehicles A and B, respectively, mutually oppose in parallel at right angles (substantially 90 degrees) to a vehicle moving direction while the center axes AaCL and Baa of the antennas Aa and Ba, respectively, mutually oppose.

However, when considerations are given to widths of the respective vehicles A and B (widths in a horizontal direction orthogonal to a moving direction) and to a width of a road (road width), there may be a case where the power transmitting and receiving devices cannot perform the running pattern shown in FIG. 20A. In particular, in a case where the road width is substantially equal to the vehicle width, it is difficult to move the respective vehicles A and B in a horizontal direction (in a direction of the vehicle width). In such a case, the power transmitting and receiving devices of the respective vehicles perform power charging and discharging according to the running pattern shown in FIG. 20B.

In a case where the road width is sufficiently greater than the vehicle width, that is, in a case where the vehicles A and B are allowed to move in a horizontal direction, it becomes possible to control the running of the vehicles by further dividing the running pattern.

More specifically, FIGS. 22A through 22D all show different running patterns. Herein, a center line CL located at a center portion of the road R in a width direction (a horizontal direction in the drawing), a right line RL located on the right of the center line CL with respect to a vehicle moving direction (upward in the drawing), and a left line LL located on the left of the center line CL with respect to the vehicle moving direction are drawn on a road R as running guide lines. A description will now be given to a case where the antennas Aa and Ba are provided to the vehicles A and B, respectively in right portions (portion on the right of at least a center line extending in a longitudinal direction at a center portion of the vehicle in the width direction).

Figure 22A:
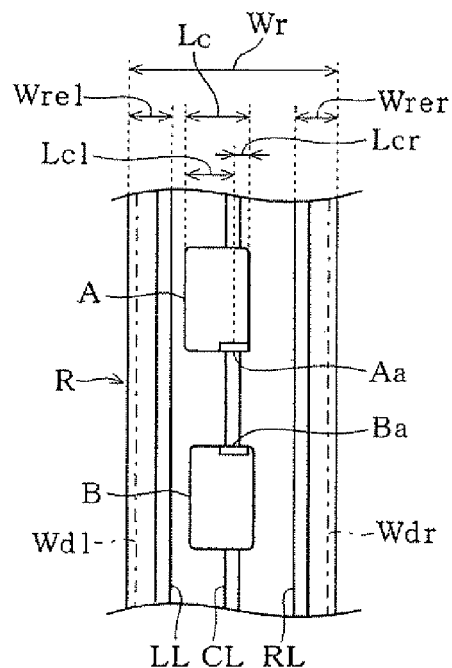
FIGS. 22A through 22D are diagrams describing different running patterns (Part 2)

In the running pattern shown in FIG. 22A, the power transmitting and receiving devices of the respective vehicles A and B control running of the corresponding vehicles A and B so that the corresponding antennas Aa and Ba move onto the center line CL on the road R.

Figure 22B:
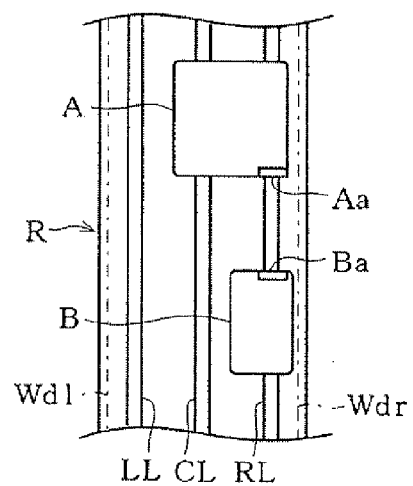

In the running pattern shown in FIG. 22B, the power transmitting and receiving devices of the respective vehicles A and B control running of the corresponding vehicles A and B so that the corresponding antennas Aa and Ba move onto the right line RL on the road R.

Figure 22C:
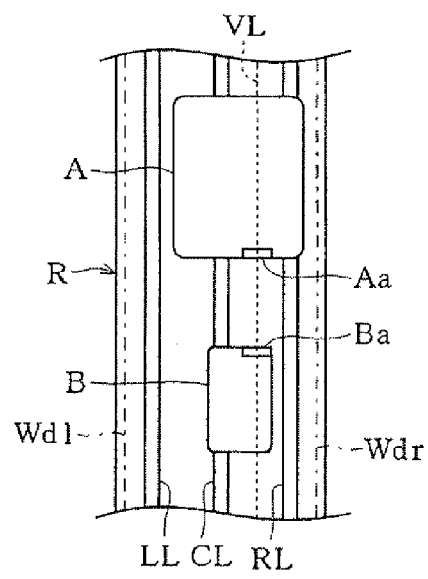

In the running pattern shown in FIG. 22C, the power transmitting and receiving devices of the respective vehicles A and B control running of the corresponding vehicles A and B so that the corresponding antennas Aa and Ba move onto a virtual line VL, which is a running guide line set in reference to the right line RL on the road R.

Figure 22D:
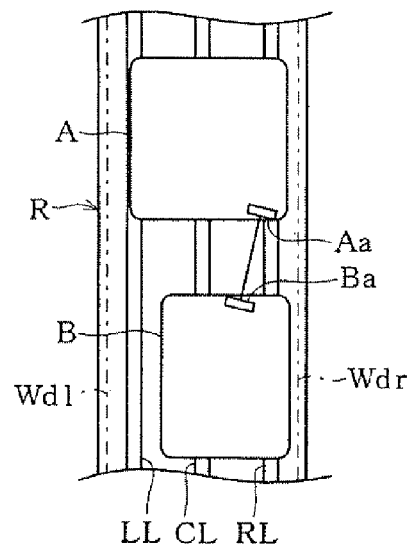

The running pattern shown in FIG. 22D shows a state where at least one of the antennas Aa and Ba of the vehicles A and B, respectively, is not allowed to move onto any one of the running guide lines (in this case, the center line CL, the right line RL, the left line LL, and the virtual line VL) drawn on the road R.

Regarding the running pattern shown in FIG. 22B, because the antennas Aa and Ba are provided to the vehicles A and B, respectively, on the right portions in this case, this is a running pattern by which the respective antennas Aa and Ba move onto the right line RL. However, in a case where the antennas Aa and Ba are provided to the vehicles A and B, respectively, on the left portions (portion on the left of at least a center line extending longitudinally at a center portion of the vehicle in the width direction), this pattern is a running pattern by which the respective antennas Aa and Ba move onto the left lines LL. Also, regarding the running pattern shown in FIG. 22C, in a case where the antennas Aa and Ba are provided to the vehicles A and B, respectively, on the left portions, this is a running pattern by which the respective antennas Aa and Ba move onto a virtual line (not shown) set in reference to the left line LL on the road R.

Figure 23:
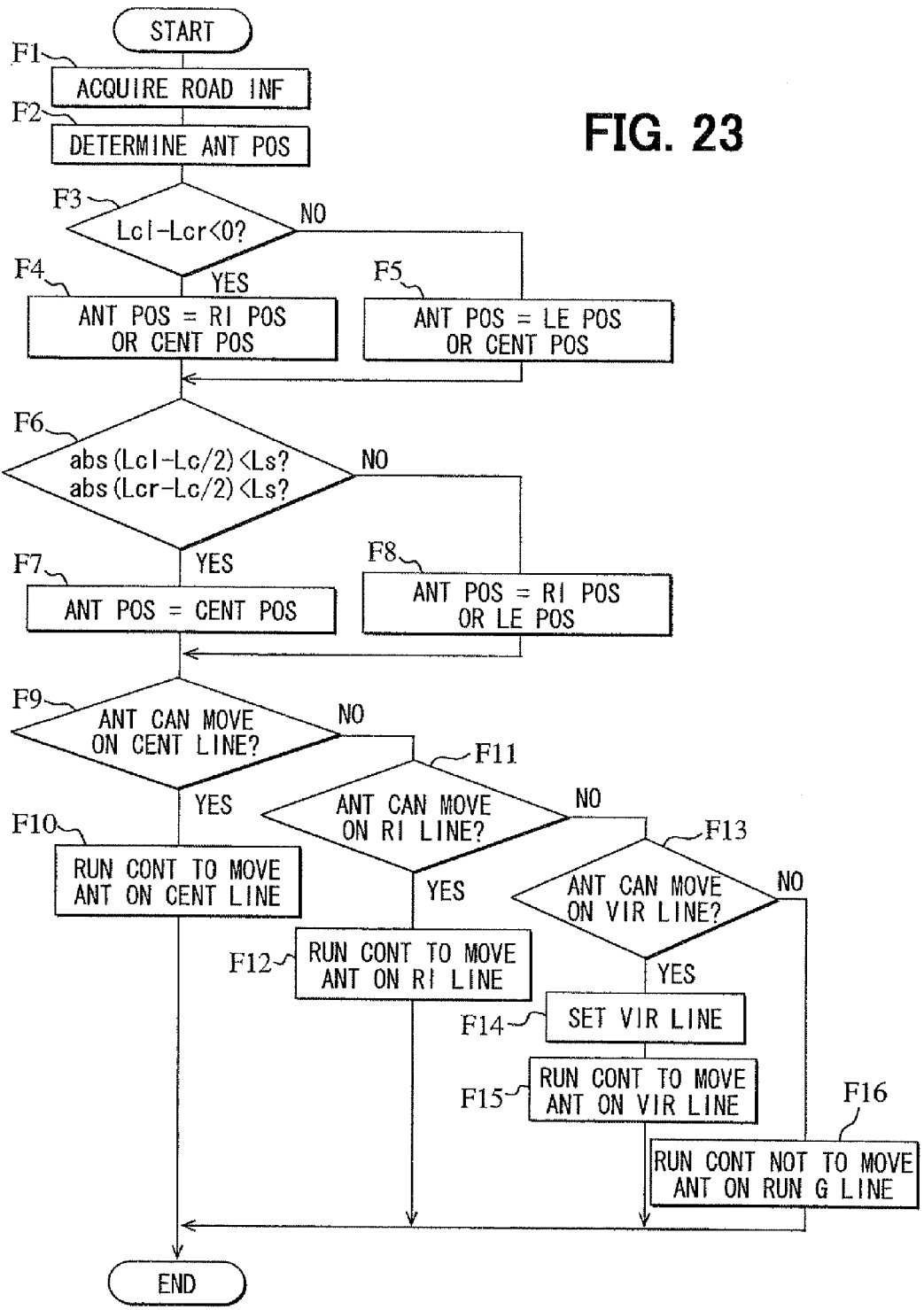
FIG. 23 is a flowchart showing a control content.

A description will now be given to a manner in which the running patterns shown in FIGS. 22A through 22D are selected depending on a relation between a width of the road R and the widths of the respective vehicles A and B with reference to the flowchart shown in FIG. 23.

Firstly, the power transmitting and receiving devices (main controllers) of the respective vehicles A and B acquire road information of the road R on which the vehicles A and B are running (Step F1). The road information may be pre-stored in storage devices of the power transmitting and receiving devices of the respective vehicles A and B or downloaded from the information center 13 when necessary.

The road information contains road width data (denoted by Wr as width data of the road R, see FIG. 22A), inter-running-guide-line distance data (data on a distance between the right line RL and the center line CL, data on a distance between the left line LL and the center line CL, and data on a distance between the right line RL and the left line LL), data denoted by Wrer (see FIG. 22A) on a distance from a right end of the road R to the right line RL, data denoted by Wrel (see FIG. 22A) on a distance from a left end of the road R to the left line LL, and the like.

The respective power transmitting and receiving devices determine the installed positions of the vehicle-vehicle power transmitting and receiving antennas of the corresponding vehicles A and B (Step F2). In this case, there are set at least three positions: a center installation position coinciding with the center line longitudinally extending in the center portion of the vehicles in a horizontal direction, a right installation position that is a portion on the right of the center line, and a left installation position that is a portion on the left of the center line. The respective power transmitting and receiving devices are configured to mutually exchange installation position information specifying the installed position (in this case, any one of the center installation position, the right installation position, and the left installation position) of the own vehicle-vehicle power transmitting and receiving antenna. On the basis of the installation position information, the respective power transmitting and receiving devices understand the installed position of the vehicle-vehicle power transmitting and receiving antenna of the own vehicle and the installed position of the vehicle-vehicle power transmitting and receiving antenna of the other vehicle.

In this case, the power transmitting and receiving device of each vehicle holds data denoted by Lcr (see FIG. 22A) on a distance from the center position of the vehicle-vehicle power transmitting and receiving antenna to a right end portion of the vehicle and data denoted by Lcl (see FIG. 22A) on a distance from the center position of the vehicle-vehicle power transmitting and receiving antenna to a left end portion of the vehicle. The power transmitting and receiving devices of the respective vehicles determine the installed positions of the vehicle-vehicle power transmitting and receiving antennas of the corresponding vehicles in accordance with Equation (1) below using the distance data Lcr and Lcl (Step F3):

$$Lcl - Lcr < 0 \qquad \text{Equation (1).}$$

In this case, when Equation (1) above, that is, $Lcl-Lcr<0$, is established (Step F3: YES), the power transmitting and receiving device of this vehicle determines that the installed position of the vehicle-vehicle transmitting and receiving antenna of this vehicle is the right installation position or the center installation position of the vehicle (Step F4). On the contrary, in a case where Equation (1) above, that is, $Lcl-Lcr<0$, is not established (Step F3: NO), the power transmitting and receiving device of this vehicle determines that the installed position of the vehicle-vehicle power transmitting and receiving antenna of this vehicle is the left installation position or the center installation position of the vehicle (Step F5).

Subsequently, the power transmitting and receiving devices of the respective vehicles determine whether the installed positions of the vehicle-vehicle transmitting and receiving antennas of the corresponding vehicles are the center installation position in accordance with Equation (2), Equation (3), and Equation (4) as follows (Step F6):

$$Lc = Lcl + Lcr \quad (2)$$

$$abs(Lcl - Lc/2) \leq Ls \quad (3)$$

$$abs(Lcr - Lc/2) \leq Ls \quad (4).$$

Herein, abs(X) is a function to find an absolute value of a value X in brackets. Also, Lc is a sum of a distance Lcl from the center position of the vehicle-vehicle power transmitting and receiving antenna to the left end portion of the vehicle and a distance Lcr from the center position of the vehicle-vehicle power transmitting and receiving antenna to the right end portion. In short, Lc represents a width of the vehicle (a width in a horizontal direction orthogonal to a moving direction). Also, Ls is a reference value indicating that the installed position of the vehicle-vehicle power transmitting and receiving antenna is the center installation position.

When both Equation (3) and Equation (4) above are established (Step F6: YES), the power transmitting and receiving device of this vehicle determines that the installed position of the vehicle-vehicle power transmitting and receiving antenna of this vehicle is the center installation position of the vehicle (Step F7). On the contrary, when at least one of Equation (3) and Equation (4) above is not established (Step F6: NO), the power transmitting and receiving device of this vehicle determines the installed position of the vehicle-vehicle power transmitting and receiving antenna of the vehicle using a determination result of Step F3 described above (Step F8). More specifically, in a case where Equation (1) above is established (Step F3: YES) and the flow has proceeded to Step F8 by way of Step F4, the power transmitting and receiving device of this vehicle determines that the installed position of the vehicle-vehicle power transmitting and receiving antenna of this vehicle is the right installation position. Meanwhile, in a case where Equation (1) is not established (Step F3: NO) and the flow has proceeded to Step F8 by way of Step F5, the power transmitting and receiving device of this vehicle determines that the installed position of the vehicle-vehicle power transmitting and receiving antenna of this vehicle is the left installation position.

Subsequently, the power transmitting and receiving devices of the respective vehicles determine whether the vehicle-vehicle power transmitting and receiving antennas of the corresponding vehicles are allowed to move onto the center line CL on the road R in accordance with Equation (5) as follows (Step F9):

$$Wr/2 - Lcl > Wdl \quad (5)$$

Herein, Wr is a width of the road R (width of a road orthogonal to a moving direction of the vehicle). Also, Wd1 is an approach limit line to the left side of the road R (leftward movable range of the road R allowed in consideration of safety degree for running, that is, a leftmost limit to an extent of which the vehicle is allowed to move leftward on the road R). A positive value is set to Wd1. Also, a smaller value can be set to Wd1 as running control of the respective vehicles by the corresponding power transmitting and receiving devices reaches a higher degree of accuracy. Also, the power transmitting and receiving device of each vehicle notifies (transmits) the power transmitting and receiving device of the other vehicle of a determination result in accordance with Equation (5) above. Herein, a distance between the leftward approach limit line Wdl and a rightward approach limit line Wdr described below may be set to Wr specifying a width of the road R.

In a case where Equation (5) above is established in both the own vehicle and the other vehicle (Step F9: YES), the power transmitting and receiving devices of the respective vehicles control running of the corresponding vehicles A and B according to the running pattern shown in FIG. 22A so that the antennas Aa and Ba of the vehicles A and B, respectively, move onto the center line CL (Step F10).

Meanwhile, in a case where Equation (5) above is not established in at least one of the own vehicle and the other vehicle (Step F9: NO), the power transmitting and receiving devices of the respective vehicles determine whether the vehicle-vehicle power transmitting and receiving antennas of the corresponding vehicles are allowed to move onto the right line RL on the road R in accordance with Equation (6) as follows (Step F11):

$$Wrer - Lcr > Wdr \quad (6).$$

Herein, Wrer is a distance from the right end portion of the road R to the right line RL. Also, Lcr is a distance from the center position of the vehicle-vehicle power transmitting and receiving antenna to the right end portion of the vehicle. Also, Wdr is an approach limit line to the right side of the road R (rightward movable range of the road R allowed in consideration of running safety degree, that is, a rightmost limit to an extent of which the vehicle is allowed to move rightward on the road R). A positive value is set to Wdr. A smaller value can be set to Wdr as running control of the respective vehicles by the corresponding power transmitting and receiving devices reaches a higher degree of accuracy. Also, it is configured in such a manner that the power transmitting and receiving device of each vehicle notifies (transmits) the power transmitting and receiving device of the other vehicle of a determination result in accordance with Equation (6) above.

In a case where Equation (6) above is established in both of the own vehicle and the other vehicle (Step F11: YES), the power transmitting and receiving devices of the respective vehicles control running of the corresponding vehicles A and B according to the running pattern shown in FIG. 22B so that the antennas Aa and Ba of the vehicles A and B, respectively, move onto the right line RL on the road R (Step F12).

Meanwhile, in a case where Equation (6) above is not established in at least one of the own vehicle and the other vehicle (Step F11: NO), the power transmitting and receiving devices of the respective vehicles determine whether the vehicle-vehicle power transmitting and receiving antennas of the corresponding vehicles are allowed to move onto the virtual line VL set in reference to the right line RL on the road R in accordance with Equation (7) and Equation (8) as follows (Step F13):

$$D = Wdr - (Wrer - Lcr) \quad (7)$$

$$Wr - Wrer - (Lcl + D) > Wdl \quad (8).$$

More specifically, the power transmitting and receiving device of each vehicle first founds a value D of the own vehicle (D (own vehicle)) in accordance with Equation (7) above and notifies (transmits) the power transmitting and receiving device of the other vehicle of D (own vehicle) thus found. Hence, the power transmitting and receiving device of each vehicle holds the value D notified from the other vehicle as D (other vehicle). The power transmitting and receiving device of each vehicle then compares the value D of the own vehicle (D (own vehicle)) with the value D of the other vehicle (D (other vehicle)), and sets whichever is the greater as the value D used in Equation (8) above. It may be configured in such a manner that one power transmitting and receiving device computes the value D used in Equation (8) above and transmits the computed value D to the power transmitting and receiving device of the other vehicle, so that the value D is used commonly with the other power transmitting and receiving device.

Subsequently, the power transmitting and receiving devices of the respective vehicles determine whether Equation (8) above is established for the own vehicle and notifies (transmits) the power transmitting and receiving device of the other vehicle of a determination result.

In a case where Equation (8) above is established in both the own vehicle and the other vehicle, the power transmitting and receiving devices of the respective vehicles determine "YES" in Step F13. Meanwhile, in a case where Equation (8) above is not established in at least one of the own vehicle and the other vehicle, the power transmitting and receiving devices of the respective vehicles determine "NO" in Step F13.

In a case where a determination of "YES" is made in Step F13, the power transmitting and receiving devices of the respective vehicles set the virtual line VL at a position spaced by a distance D on the left side of the right line RL on the road R (Step F14). Then, the power transmitting and receiving devices of the respective vehicles control running of the corresponding vehicles A and B by the running pattern shown in FIG. 22C so that the antennas Aa and Ba of the vehicles A and B, respectively, move onto the virtual line VL (Step F15).

On the contrary, in a case where a determination of "NO" is made in Step F13, the power transmitting and receiving devices of the respective vehicles determine that it is impossible to move the antenna Aa and Ba of the vehicles A and B, respectively, onto any single running guide line (including the virtual line VL). Hence, the power transmitting and receiving devices of the respective vehicles control running of the corresponding vehicles A and B by the running pattern shown in FIG. 22D in a state where both of the antenna Aa and Ba of the vehicles A and B, respectively, do not move a single running guide line, that is, in a state where at least one of the antennas Aa and Ba of the vehicles A and B, respectively, is moving off the running guide line (Step F16).

In a case where running is controlled by the running pattern shown in FIG. 22D, abs(D (own vehicle)−D (other vehicle)), which is a difference between D (own vehicle) and D (other vehicle), is given as a distance between the respective antennas in a direction orthogonal to a travel direction (moving direction) of the respective vehicles, that is, in a width direction of the vehicles (horizontal direction).

The above has described an example of control in a case where both of the vehicle A and the vehicle B are provided with the vehicle-vehicle power transmitting and receiving antennas in the right portions of the vehicles A and B. In a case where the vehicle-vehicle power transmitting and receiving antennas of the respective vehicles are provided to left portions of the respective vehicles, control is performed according to the contents described above by reversing left and right.

Also, even in a case where the vehicle-vehicle power transmitting and receiving antenna is provided to one vehicle in the right portion of this vehicle and the vehicle-vehicle power transmitting and receiving antenna is provided to the other vehicle in the left portion of this vehicle, the system is basically applicable by the control according to the contents described above. It should be noted, however, that it is recommendable to perform control as follows particularly in the case of the running pattern shown in FIG. 22D.

That is, as is shown in FIG. 24A, when running of the respective vehicles A and B is controlled so that the vehicle-vehicle power transmitting and receiving antennas of the respective vehicles A and B move onto the center line CL on the road R, there may be a case where the left portion of the vehicle A comes out of the left end portion of the road R or the right portion of the vehicle B comes out of the right end portion of the road R. In such a case, the power transmitting and receiving devices of the respective vehicles A and B select any one of a running pattern shown in FIG. 24B and a running pattern shown in FIG. 24C.

The running pattern shown in FIG. 24B is a running pattern by which running of the respective vehicles A and B is controlled so that right surfaces of the respective vehicles A and B move along a virtual line VLr set on a slightly inner side than (left side of) the right end portion of the road R. Also, the running pattern shown in FIG. 24C is a running pattern by which running of the respective vehicles A and B is controlled so that left surfaces of the respective vehicles A and B move along a virtual line VLl set on a slightly inner side than (right side of) the left end portion of the road R.

Of the running patterns shown in FIG. 24B and FIG. 24C, the power transmitting and receiving devices of the respective vehicles A and B select the running pattern that decreases a distance d between the respective antennas in a direction orthogonal to a travel direction (moving direction) of the respective vehicles A and B, that is, in a width direction (horizontal direction) of the vehicles A and B. In this case, the distance d in the running pattern shown in FIG. 24B is found by a difference between Lcr(A), which is the Lcr of the vehicle A, and Lcr(B), which is the Lcr of the vehicle B. Also, the distance d in the running pattern shown in FIG. 24C is found by a difference between Lcl(A), which is the Lcl of the vehicle A, and Lcl(B), which is the Lcl of the vehicle B.

Also, as is shown in FIG. 25, it is possible to find angles of horizontal adjustment, θ, of the respective antennas Aa and Ba in accordance with Equation (9) below using a distance Dx between the respective antennas Aa and Ba in a direction orthogonal to a travel direction (upward in the drawing) of the respective vehicles A and B (a width direction of the respective vehicles A and B and a horizontal direction in the drawing) and an inter-vehicle distance Dy between the respective vehicles A and B (a distance between the respective vehicles A and B along the travel direction, and a distance in a vertical direction in the drawing):

$$\tan \theta = Dx/Dy \qquad (9).$$

When the installed position of the vehicle-vehicle power transmitting and receiving antenna is fixed to (standardized at) the center installation position, uniaxial rotation control in a vertical direction alone is sufficient for angle control on the vehicle-vehicle power transmitting and receiving antenna. Hence, angle control can be simpler.

Also, it may be configured in such a manner that a user can select any one of the running patterns shown in FIG. 22A and FIG. 22B via the power transmitting and receiving device while the power transmitting and receiving device notifies (transmits) the information center 13 of running pattern information specifying the selected running pattern, so that the information center 13 extracts a vehicle that matches the selected running pattern (a vehicle capable of transmitting and receiving power most efficiently with the vehicle that has transmitted the running pattern information) and notifies the vehicle that has transmitted the running pattern information of the vehicle thus extracted.

The above disclosure has the following aspects.

According to an aspect of the present disclosure, a power transmitting and receiving system for a vehicle includes: an information communication device for communicating with another vehicle by transmitting and receiving vehicle positional relation specifying information, which includes: longitudinal inter-vehicle distance specifying information for specifying a distance between the vehicle and the another vehicle in front of or behind the vehicle; and lateral displacement amount specifying information for specifying an amount of lateral displacement between the vehicle and the another vehicle; a power transmitting and receiving antenna, which has a controllable directionality, transmits wirelessly an electric power of the vehicle to the another vehicle, and receives wirelessly an electric power of the another vehicle; a directionality specifying information transmitting and receiving device for transmitting directionality specifying information of the power transmitting and receiving antenna of the vehicle to the another vehicle and for receiving directionality specifying information of a power transmitting and receiving antenna of the another vehicle; and an antenna directionality controller for controlling the directionality of the power transmitting and receiving antenna of the vehicle and a directionality of the power transmitting and receiving antenna of the another vehicle based on the vehicle positional relation specifying information, the directionality specifying information of the vehicle, and the directionality specifying information of the another vehicle so that the power transmitting and receiving antenna of the vehicle faces the power transmitting and receiving antenna of the another vehicle.

In the above system, in a case where wireless vehicle-vehicle power transmission and reception is performed, the power transmitting and receiving antennas of the respective vehicles mutually oppose according to a positional relation of the respective vehicles and directionalities (i.e., orientations) of the power transmitting and receiving antennas of the respective vehicles. It thus becomes possible to efficiently transmit and receive power wirelessly between vehicles.

Alternatively, the power transmitting and receiving antenna may transmit and receive the electric power in a resonance induction manner. Incidentally, in a case where wireless power transmission and reception is performed by electromagnetic induction, it is difficult to transmit and receive power unless a distance between vehicles that are to perform power transmission and reception is short. Such being the case, according to the power transmitting and receiving system of the above case, it is configured in such a manner that wireless power transmission and reception by the power transmitting and receiving antennas is performed by resonance induction. Owing to this configuration, it becomes possible to perform wireless power transmission and reception in a reliable manner even when there is a relatively long distance (a distance too far to perform power transmission and reception by electromagnetic induction) between vehicles that are to perform power transmission and reception.

Alternatively, the lateral displacement amount specifying information may include information of a distance between a center position of the vehicle in a lateral direction and a position of the power transmitting and receiving antenna. Owing to this configuration, even in a case where the power transmitting and receiving antenna is installed at a position displaced from the center position of the vehicle in a horizontal direction, it becomes possible to adjust an orientation of the power transmitting and receiving antenna by taking an amount of this displacement into account.

Alternatively, the power transmitting and receiving system may further include: a light-emitting device for emitting spot light from a center of the power transmitting and receiving antenna; and a driving controller for controlling a driving condition of the vehicle and a driving condition of the another vehicle so that the spot light emitted from the light-emitting device of the vehicle shines on the center of the power transmitting and receiving antenna of the another vehicle, or the spot light emitted from the light-emitting device of the another vehicle shines on the center of the power transmitting and receiving antenna of the vehicle. The antenna directionality controller controls the directionality of the power transmitting and receiving antenna of each of the vehicle and the another vehicle when the spot light emitted from the vehicle shines on the center of the power transmitting and receiving antenna of the another vehicle, or the spot light emitted from the another vehicle shines on the center of the power transmitting and receiving antenna of the vehicle. By utilizing a spot of light in this manner, it becomes possible to adjust an orientation (i.e., directionality) of the power transmitting and receiving antenna at a higher degree of accuracy.

Alternatively, the driving controller automatically may control the driving condition of each of the vehicle and the another vehicle while the power transmitting and receiving antenna transmits or receives the electric power. Owing to this configuration, a positional relation of the power transmitting and receiving antennas having been adjusted so that orientations thereof mutually oppose is stabilized while wireless vehicle-vehicle power transmission and reception is performed. It thus becomes possible to wirelessly transmit and receive power between vehicles more efficiently.

Alternatively, the power transmitting and receiving system may further include: a selector for selecting whether the vehicle transmits the electric power to the another vehicle or the vehicle receives the electric power from the another vehicle. Owing to this configuration, a degree of freedom in selecting a power-transmitter vehicle and a power-receiver vehicle can be enhanced. It thus becomes possible to set the power-transmitter vehicle and the power-receiver vehicle appropriately.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A power transmitting and receiving system for a vehicle comprising:
    an information communication device for communicating with another vehicle by transmitting and receiving vehicle positional relation specifying information, which includes: longitudinal inter-vehicle distance specifying information for specifying a distance between the vehicle and the another vehicle in front of or behind the vehicle; and lateral displacement amount specifying information for specifying an amount of lateral displacement between the vehicle and the another vehicle;
    a power transmitting and receiving antenna, which has a controllable directionality, transmits wirelessly an electric power of the vehicle to the another vehicle, and receives wirelessly an electric power of the another vehicle;
    a directionality specifying information transmitting and receiving device for transmitting directionality specifying information for specifying a directionality of the power transmitting and receiving antenna of the vehicle to the another vehicle and for receiving directionality specifying information for specifying a directionality of a power transmitting and receiving antenna of the another vehicle;

an antenna directionality controller for controlling the directionality of the power transmitting and receiving antenna of the vehicle and a directionality of the power transmitting and receiving antenna of the another vehicle based on the vehicle positional relation specifying information, the directionality specifying information of the power transmitting and receiving antenna of the vehicle, and the directionality specifying information of the power transmitting and receiving antenna of the another vehicle so that the power transmitting and receiving antenna of the vehicle faces the power transmitting and receiving antenna of the another vehicle;

a light-emitting device for emitting spot light from a center of the power transmitting and receiving antenna; and a driving controller for controlling a driving condition of the vehicle and a driving condition of the another vehicle so that the spot light emitted from the light-emitting device of the vehicle coincides with the center of the power transmitting and receiving antenna of the another vehicle, or the spot light emitted from the light-emitting device of the another vehicle coincides with the center of the power transmitting and receiving antenna of the vehicle, wherein, when the driving controller confirms that the spot light emitted from the light-emitting device of the vehicle coincides with the center of the power transmitting and receiving antenna of the another vehicle, the driving controller automatically controls the driving condition of the vehicle so as to maintain a confirmed state, wherein the antenna directionality controller controls the directionality of the power transmitting and receiving antenna of the vehicle and the directionality of the power transmitting and receiving antenna of the another vehicle after the driving controller controls the spot light emitted from the vehicle to coincide with the center of the power transmitting and receiving antenna of the another vehicle, or the driving controller controls the spot light emitted from the another vehicle to coincide with the center of the power transmitting and receiving antenna of the vehicle, and wherein, when the power transmitting and receiving antenna of the vehicle does not face the power transmitting and receiving antenna of the another vehicle, directionality adjustment request information including an adjustment amount of the directionality necessary for facing the power transmitting and receiving antenna of the vehicle and the power transmitting and receiving antenna of the another vehicle mutually is transmitted to the another vehicle.

2. The power transmitting and receiving system according to claim 1,
wherein the power transmitting and receiving antenna transmits and receives the electric power wirelessly in a resonance induction manner.

3. The power transmitting and receiving system according to claim 1,
wherein the lateral displacement amount specifying information is defined as information of a distance between a center position of the vehicle in a lateral direction and a position of the power transmitting and receiving antenna arranged in the vehicle.

4. The power transmitting and receiving system according to claim 1,
wherein the driving controller automatically controls the driving condition of each of the vehicle and the another vehicle while the power transmitting and receiving antenna transmits or receives the electric power.

5. The power transmitting and receiving system according to claim 1, further comprising:
a selector for selecting whether the vehicle transmits the electric power to the another vehicle or the vehicle receives the electric power from the another vehicle.

* * * * *